United States Patent
Baba

(10) Patent No.: US 11,760,840 B2
(45) Date of Patent: Sep. 19, 2023

(54) THERMOPLASTIC RESIN COMPOSITION AND MOLDED ARTICLE THEREOF

(71) Applicant: TEIJIN LIMITED, Osaka (JP)

(72) Inventor: Ozora Baba, Osaka (JP)

(73) Assignee: TEIJIN LIMITED, Osaka (JP)

( * ) Notice: Subject to any disclaimer, the term of this patent is extended or adjusted under 35 U.S.C. 154(b) by 60 days.

(21) Appl. No.: 16/966,713

(22) PCT Filed: Feb. 1, 2019

(86) PCT No.: PCT/JP2019/003730
§ 371 (c)(1),
(2) Date: Jul. 31, 2020

(87) PCT Pub. No.: WO2019/151504
PCT Pub. Date: Aug. 8, 2019

(65) Prior Publication Data
US 2021/0032409 A1    Feb. 4, 2021

(30) Foreign Application Priority Data

Feb. 5, 2018 (JP) ................... 2018-018358

(51) Int. Cl.
*C08K 9/06* (2006.01)
*C08G 77/448* (2006.01)
*B01J 31/22* (2006.01)

(52) U.S. Cl.
CPC ........ *C08G 77/448* (2013.01); *B01J 31/2208* (2013.01); *C08K 9/06* (2013.01); *B01J 2531/0238* (2013.01); *B01J 2531/46* (2013.01)

(58) Field of Classification Search
CPC . C08K 9/06; C08L 83/10; C08L 67/00; C08L 69/00
See application file for complete search history.

(56) References Cited

U.S. PATENT DOCUMENTS

| | | | | |
|---|---|---|---|---|
| 4,357,271 A * | 11/1982 | Rosenquist | ............ | C08K 9/06 523/213 |
| 5,516,920 A | 5/1996 | Nesvadba et al. | | |
| 5,571,851 A * | 11/1996 | Freeman | ............ | C08K 9/06 523/213 |
| 8,779,040 B2 * | 7/2014 | van der Weele | ..... | C08K 5/5333 524/133 |
| 2003/0125441 A1 | 7/2003 | Vathauer et al. | | |
| 2003/0187151 A1 | 10/2003 | Adams et al. | | |
| 2004/0176564 A1 | 9/2004 | Yamamoto et al. | | |
| 2005/0170180 A1 * | 8/2005 | Kawa | ............ | C08J 7/046 428/402 |
| 2006/0142527 A1 * | 6/2006 | Glasgow | ............ | C08G 63/64 528/26 |
| 2009/0088514 A1 * | 4/2009 | Shiping | ............ | C08L 69/00 524/451 |
| 2011/0269880 A1 * | 11/2011 | Pfaendner | ............ | C08K 3/34 524/140 |
| 2012/0289655 A1 * | 11/2012 | Sumita | ............ | B29C 45/0001 525/67 |
| 2013/0079445 A1 * | 3/2013 | Martin | ............ | C09C 1/405 524/263 |
| 2013/0190425 A1 * | 7/2013 | Zhu | ............ | C08L 69/00 523/451 |
| 2013/0317142 A1 * | 11/2013 | Chen | ............ | C08L 83/10 524/122 |
| 2014/0357769 A1 | 12/2014 | Zheng et al. | | |
| 2016/0024301 A1 | 1/2016 | Hayashida | | |
| 2017/0335100 A1 * | 11/2017 | Miyake | ............ | C08L 27/18 |

FOREIGN PATENT DOCUMENTS

| | | |
|---|---|---|
| CN | 105051110 | 11/2015 |
| JP | 51-102043 | 9/1976 |
| JP | 1-318051 | 12/1989 |
| JP | 5-222283 | 8/1993 |
| JP | 7-233160 | 9/1995 |
| JP | 10-237295 | 9/1998 |
| JP | 2000-256546 | 9/2000 |
| JP | 2000-313799 | 11/2000 |
| JP | 2002-60602 | 2/2002 |
| JP | 2002-121366 | 4/2002 |
| JP | 2005-521772 | 7/2005 |
| JP | 3897756 | 3/2007 |
| JP | 2007-262369 | 10/2007 |
| JP | 2007-277382 | 10/2007 |
| JP | 4220387 | 2/2009 |
| JP | 2013-18864 | 1/2013 |

OTHER PUBLICATIONS

International Search Report dated Mar. 12, 2019 in International (PCT) Application No. PCT/JP2019/003730.

\* cited by examiner

*Primary Examiner* — Margaret G Moore
(74) *Attorney, Agent, or Firm* — Wenderoth, Lind & Ponack, L.L.P.

(57) ABSTRACT

The present invention provides a resin composition which is excellent in moisture and heat resistance, thermal stability, rigidity, surface impact properties and chemical resistance. The resin composition includes, based on a total of 100 parts by weight consisting of (A) 30 to 99 parts by weight of a resin (component A), which is composed of 10 to 100 wt % of a polycarbonate-polydiorganosiloxane copolymer resin (component A1) and 0 to 90 wt % of an aromatic polycarbonate resin (component A2), and (B) 1 to 70 parts by weight of a polyester resin (component B), (C) 10 to 50 parts by weight of a filler (component C) which is surface-treated with a silane coupling agent having an alkyl group, wherein the content of rubber-like polymer is 3 parts by weight or less.

11 Claims, No Drawings

THERMOPLASTIC RESIN COMPOSITION AND MOLDED ARTICLE THEREOF

TECHNICAL FIELD

The present invention relates to a resin composition comprising a polycarbonate resin, a polyester resin, and a filler, as well as a molded article. In particular, the present invention relates to a resin composition and a molded article, the resin composition comprising a polycarbonate-polydiorganosiloxane copolymer resin, an aromatic polycarbonate resin, a polyester resin, and a filler which is surface-treated with a silane coupling agent having an alkyl group, the resin composition having suitable moisture and heat resistance, thermal stability, rigidity, surface impact properties, and chemical resistance.

BACKGROUND

Resin compositions comprising a polycarbonate resin, a polyester resin, and a filler (hereinafter referred to as PC/PEST/filler alloys) are resin compositions which has further rigidity in addition to improved chemical resistance while maintaining excellent aesthetic characteristics, mechanical properties, and dimensions stability of the polycarbonate resin. Therefore, they are widely used in electrical/electronic, mechanical, OA, vehicular, and medical applications. Furthermore, molded articles molded from a PC/PEST/filler alloys are suitable for painted or unpainted members, they are especially useful for vehicles and office automation applications, and various developments are in progress (refer to Patent Literature 1 and 2).

In recent years, in the field of vehicle and the field of OA, weight reductions and cost reductions of components are rapidly progressing. For example, for vehicle applications, technological developments using resin materials as large parts exemplified by body panels, such as fenders and back doors, have been active, and PC/PEST/filler alloys are preferred resin materials due to the excellent properties described above. However, since this material is inferior in moisture and heat resistance as compared with materials such as steel plates, which have conventionally been used, applicable portions and sizes are limited, and thus, the use thereof is limited. Furthermore, the trends of reducing the thickness of components for the purpose of weight reduction, reduction of the number of parts for cost reductions, and modularization of parts are also accelerating. Therefore, in order to easily obtain a thinner, more complicated and larger-shaped molded article, an improvement in processing characteristics is also needed. As a method of using existing equipment to improve processing characteristics, a method of increasing the molding temperature and increasing the fluidity is generally used, and as a result, it is necessary that the resin materials have better thermal stability. Further, with the thinning of parts for the purpose of weight reduction, it is necessary that the resin materials have greater rigidity, greater toughness, and greater heat resistance in order to obtain performance equivalent to conventional component strength.

Though a method of increasing filler content in a resin material is conventional as a method for increasing the rigidity of a resin material, there is a problem that the effect of weight reduction, which is the original purpose, is diminished. Though a method in which a rubber-like polymer is mixed is conventional as a method for increasing the toughness of a resin material, there is a problem in that the rigidity and heat resistance are reduced. Thus, in order to achieve weight reduction and cost reduction in components, it is necessary that PC/PEST/filler alloys have better moisture and heat resistance and thermal stability, as well as higher rigidity and toughness.

Patent Literature 3 examines a technology in which an inorganic compound with aluminum silicate as the primary component is mixed to improve the moisture and heat resistance of a resin composition comprising a polycarbonate resin and a polyester resin is investigated. Mixing of such additives has a problem in that the original effect of weight reduction is diminished, for example, a problem of an increase in specific gravity, in addition to an increase in the cost of the resin composition and an increase in the number of steps for manufacturing the resin composition. There is a risk that the thermal stability may be reduced, and since there no information regarding thermal stability is demonstrated, it is difficult to say that sufficient technical examination was conducted.

Patent Literature 4 examines a technology in which a phosphite-based antioxidant is mixed with a PC/PEST/filler alloy. Though decomposition of the resin during mold processing is suppressed by such a technology, the moisture and heat resistance is not investigated, and thus, further technical improvement is required.

Patent Literature 5 examines a technology in which an acidic phosphorus-based additive and an inorganic filler having a moisture content which is controlled to 0.25 weight % or less are mixed with a PC/PEST alloy. Though melt stability is improved by mixing an inorganic filler having a moisture content of 0.25 weight % or less, the management of the moisture content of the inorganic filler to be mixed leads to an increase in steps during production of the resin composition, which in turn leads to increased costs. As a result, this is not a technology which can be generally adopted. Furthermore, the moisture and heat resistance of the obtained resin composition is not investigated, and thus, further technical improvement is required.

Patent Literature 6 investigates a technology in which a dispersion state is controlled such that an inorganic compound having pH 8.0 or more and having an $SiO_2$ unit occupying 30 wt % or more is not present in the polycarbonate resin to the greatest extent possible. Though improvement of thermal stability at the time of molding by this technique is confirmed, the moisture and heat resistance is not investigated. Furthermore, there is a high risk that the manufacturing method to obtain such a resin composition is limited, whereby there is in an increase in the number of manufacturing steps and an increase in cost, and thus, it cannot be said that the technology is highly versatile.

Since the method of mixing further additives and the method of controlling the dispersion state of the filler in order to increase the moisture and heat resistance and thermal stability of a PC/PEST/filler alloy make it difficult to achieve both moisture and heat resistance and thermal stability, and also increase cost, further technologies are needed. In light of these circumstances, as a means for the PC/PEST/filler alloy to satisfy the above requirements, an alloy material using PET manufactured with a specific polymerization catalyst has been proposed (refer to Patent Literature 7 and 8).

Patent Literature 7 proposes the use of a germanium catalyst as the polymerization catalyst in order to improve the deterioration in color, melt stability, appearance, and moldability of PET produced with common antimony compounds and titanium compounds. However, such a technology does not sufficiently satisfy the higher thermal stability necessary for vehicle and OA applications, and information regarding moisture and heat resistance is not taught.

Patent Literature 8 proposes improvements in color, thermal stability, and melt stability by incorporating a polyester resin produced using 1 to 30 ppm of a titanium-containing catalyst compound. Though a reduction in the amount of catalyst improves thermal stability and melt stability, thermal stability tends to decrease as the amount of polyester resin increases, and thus, further improvement is required. Furthermore, information regarding moisture and heat resistance, which is becoming more necessary for PC/PEST/filler alloys, is not taught in any way.

Patent Literature 9 describes that by producing a polyester resin using a titanium-containing catalyst compound having a specific structure, a polyester resin with suitable color (b value), few foreign substances, and excellent thermal stability during melting can be obtained. However, Patent Literature 9 does not describe the effect on resin compositions containing a resin other than a polyester resin, and does not teach any information regarding moisture and heat resistance, that is becoming more necessary for PC/PEST/filler alloys.

Patent Literature 10 describes that a polycarbonate resin having excellent toughness was obtained using an modifier for impact resistance and a surface-treated wollastonite. However, only a limited number of surface treatment agents are used, and no information regarding the effect of wollastonite surface-treatment agents on surface impact properties is disclosed. Furthermore, the content of the wollastonite is 10 parts by weight or less. High filling regions, in which improvement of surface impact properties is required, are not investigated. From the foregoing, a polycarbonate resin composition and molded article having suitable moisture and heat resistance and thermal stability and having excellent mechanical strength, such as rigidity and surface impact properties, have not yet been provided.

CITATION LIST

Patent Literature

[PTL 1] Japanese Unexamined Patent Publication (Kokai) No. 2000-256546
[PTL 2] Japanese Unexamined Patent Publication (Kokai) No. 2002-60602
[PTL 3] Japanese Unexamined Patent Publication (Kokai) No. H10-237295
[PTL 4] Japanese Unexamined Patent Publication (Kokai) No. H5-222283
[PTL 5] Japanese Unexamined Patent Publication (Kokai) No. 2002-121366
[PTL 6] Japanese Unexamined Patent Publication (Kokai) No. 2000-313799
[PTL 7] Japanese Unexamined Patent Publication (Kokai) No. S51-102043
[PTL 8] Japanese Unexamined PCT Publication (Kohyo) No. 2005-521772
[PTL 9] Japanese Patent No. 3897756
[PTL 10] Japanese Patent No. 4220387

SUMMARY

Technical Problem

The object of the present invention is to provide a resin composition which comprises a polycarbonate resin, a polyester resin, and a filler and which has excellent moisture and heat resistance, thermal stability, rigidity, surface impact properties, and chemical resistance, and a molded article, in particular for interior parts exterior parts of a vehicle.

Solution to Problem

As a result of rigorous investigation in order to achieve the object described above, the present inventors have discovered that a resin composition which achieves the object described above can be obtained by using a filler that has been surface-treated with a specific silane coupling agent and including substantially no rubber-like polymer in the PC/PEST/filler alloy of the prior art. Without being bound by theory, it is believed that using a filler which has been surface-treated with a specific silane coupling agent, in addition to improving the moisture and heat resistance, voids are formed between the resin and the filler, and these voids improve impact resistance.

According to the present invention, there is provided (1) a resin composition comprising, based on a total of 100 parts by weight consisting of (A) 30 to 99 parts by weight of a resin (component A) composed of 10 to 100 wt % of a polycarbonate-polydiorganosiloxane copolymer resin (component A1) and 0 to 90 wt % of an aromatic polycarbonate resin (component A2) and (B) 1 to 70 parts by weight of a polyester resin (component B), (C) 10 to 50 parts by weight of a filler (component C) which is surface-treated with a silane coupling agent having an alkyl group, wherein the content of a rubber-like polymer is 3 parts by weight or less. According to such a constitution (1), a material having superior rigidity and surface impact properties than in the prior art can be obtained, and such material is suitable for use in fields in which there is a strong tendency toward reduction in weight, thickness, and the cost of components.

According to the present invention, there is provided, as a more preferable embodiment, (2) the resin composition according to constitution (1) described above, wherein a catalyst used in the production of the component B is a titanium-phosphorus catalyst which is obtained from a reaction between a titanium compound (I) represented by formula (I) below or a titanium compound obtained by reacting the titanium compound (I) with an aromatic polycarboxylic acid represented by formula (II) below or an anhydride thereof and a phosphorus compound represented by formula (III) below at a reaction molar ratio (mTi/mP) of a titanium atom equivalent molar amount (mTi) of the titanium compound and a phosphorus atom equivalent molar amount (mP) of the phosphorus compound in the range of 1/3 to 1/1. According to the more preferable structure (2), a resin composition having further improved moisture and heat resistance and thermal stability can be obtained.

[Chem 1]

where $R^1$, $R^2$, $R^3$, and $R^4$ each independently represent alkyl group having 2 to 10 carbon atoms, k represents an integer of 1 to 3, and when k is 2 or 3, two or three $R^2$ and $R^3$ may be the same or different from each other,

[Chem 2]

(II)

where m represents an integer of 2 to 4,

[Chem 3]

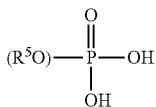

(III)

where $R^5$ represents an unsubstituted or substituted $C_{6-20}$ aryl group or $C_{1-20}$ alkyl group.

According to the present invention, there is provided, as a more preferable embodiment, (3) the resin composition according to constitution (1) or (2) described above, wherein the content of a titanium element in the component B is 0.001 to 50 ppm. According to the constitution (3), a resin composition having further improved moisture and heat resistance and thermal stability can be obtained.

According to the present invention, there is provided, as a more preferable embodiment, (4) the resin composition according to constitution (2) or (3) described above, wherein the titanium-phosphorus catalyst is a compound represented by formula (IV) below. According to the more preferable constitution (4), since a resin composition with fewer impurities can be obtained, a resin composition having further improved moisture and heat resistance and thermal stability with superior appearance can be obtained.

[Chem. 4]

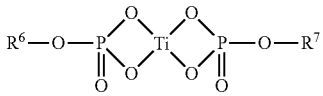

(IV)

where $R^6$ and $R^7$ each independently represent alkyl group having 2 to 12 carbon atoms or aryl group having 6 to 12 carbon atoms.

According to the present invention, there is provided, as a more preferable embodiment, (5) the resin composition according to any one of constitutions (1) to (4) described above, wherein the component B is polyethylene terephthalate. According to the constitution (5), a resin composition having excellent mechanical strength such as impact resistance, and preferable moisture and heat resistance and thermal stability can be obtained.

According to the present invention, there is provided, as a more preferable embodiment, (6) the resin composition according to any one of constitutions (1) to (5) described above, wherein the filler of the component C is at least one filler selected from the group consisting of talc, mica, and wollastonite. According to the constitution (6), a resin composition having suitable moisture and heat resistance and thermal stability and effective rigidity necessary for thinning for weight reduction can be obtained.

According to the present invention, there is provided, as a more preferable embodiment, (7) the resin composition according to any one of constitutions (1) to (6) described above, wherein the silane coupling agent having alkyl group of the component C has the chemical formula $R_{an}Si(OR_b)_{4-n}$ (where $R_a$ is alkyl group having 5 to 25 carbon atoms, $R_b$ is alkyl group having 1 to 5 carbon atoms, and n is an integer of 1 to 3).

According to the present invention, there is provided, as a more preferable embodiment, (8) a molded article obtained by molding the resin composition according to any one of structures (1) to (7) described above. Since the resin compositions of constitutions (1) to (7) described above are resin compositions to which chemical resistance and rigidity have been added in addition to the excellent properties of the aromatic polycarbonate resin and which have improved moisture and heat resistance and thermal stability, the molded article according to the constitution (8) is a molded article which is suitable in fields in which parts made of resin are desired, in particular in the fields of vehicle and OA.

According to the present invention, there is provided, as a more preferable embodiment, (9) the molded article according to constitution (8) described above, wherein the molded article is an injection-molded article or an extrusion-molded article. There are many molding machines for injection molding and extrusion molding, and various types of molding machines have been developed and are readily available for efficiently molding thin-walled molded articles, complex-shaped molded articles, ultra-small molded articles, and ultra-large molded articles. According to the constitution (9), there is provided a molded article which is excellent in not only versatility but also in terms of the steps necessary to obtain the molded article, running costs for operating the molding machine, and quality.

According to the present invention, there is provided, as a more preferable embodiment, (10) the molded article according to constitution (8) or (9) described above, wherein the molded article is a vehicle interior parts or a vehicle exterior parts. Vehicle interior and exterior members require good moisture and heat resistance, thermal stability, mechanical strength such as rigidity and impact resistance, and chemical resistance, and in particular require that weight reduction and cost reduction can be easily achieved. According to this constitution, a molded article which is suitable as a vehicle interior member or a vehicle exterior member is provided.

Advantageous Effects of Invention

Since the resin composition of the present invention has excellent moisture and heat resistance, thermal stability, rigidity, surface impact properties, and chemical resistance, it can be widely used in electric/electronic applications, mechanical applications, OA applications, automobile applications, medical applications, and other various applications. Among these applications, the present invention provides a molded article that is extremely useful as a vehicle interior member or a vehicle exterior member. Thus, the industrial effects of the present invention are extremely significant.

DESCRIPTION OF EMBODIMENTS

The details of the present invention will be further described below.

<Component A1: Polycarbonate-Polydiorganosiloxane Copolymer Resin>

As the polycarbonate-polydiorganosiloxane copolymer resin used as the component A1 in the resin composition of the present invention, a polycarbonate-polydiorganosiloxane copolymer resin consisting of a polycarbonate block represented by general formula (V) below and a polydiorganosiloxane block represented by general formula (VII) below is preferable.

[Chem. 5]

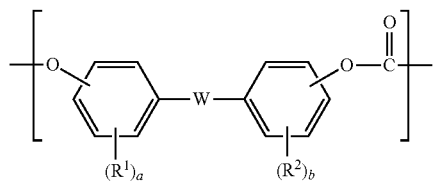

(V)

where, $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 14 carbon atoms, aralkyl group having 7 to 20 carbon atoms, aralkyloxy group having 7 to 20 carbon atoms, nitro group, aldehyde group, cyano group and carboxyl group. When there are a plurality of R's and a plurality of $R^2$'s, they may be the same or different. "a" and "b" are each an integer of 1 to 4. W is a single bond or at least one group selected from the group consisting of groups represented by the following formulas (VI).

[Chem. 6]

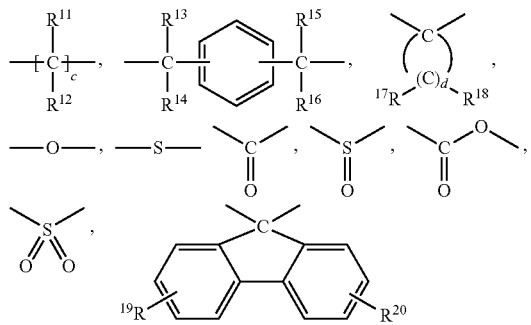

(VI)

where, $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 6 to 14 carbon atoms and aralkyl group having 7 to 20 carbon atoms. $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group. 10 Regarding each of $R^{11}$, $R^{12}$, $R^{13}$, $R^{14}$, $R^{15}$, $R^{16}$, $R^{17}$, $R^{18}$, $R^{19}$ and $R^{20}$, when there are a plurality of these groups, they may be the same or different. "c" is an integer of 1 to 10, and "d" is an integer of 4 to 7.

[Chem. 7]

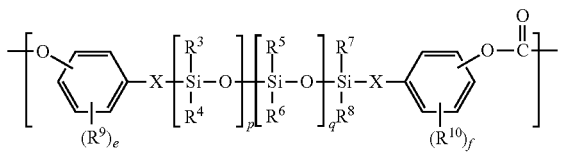

(VII)

where $R^3$, $R^4$, $R^5$, $R^6$, $R^7$, and $R^8$ are each independently a hydrogen atom, alkyl group having 1 to 12 carbon atoms, or a substituted or unsubstituted aryl group having 6 to 12 carbon atoms, $R^9$ and $R^{10}$ are each independently a hydrogen atom, a halogen atom, alkyl group having 1 to 10 carbon atoms, or alkoxy group having 1 to 10 carbon atoms, e and f are each an integer of 1 to 4, p is a natural number, q is 0 or a natural number, p+q is a natural number of 4 to 150, and X is divalent aliphatic group having 2 to 8 carbon atoms.

Examples of dihydric phenol (1) which induces carbonate unit represented by the formula (V) include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0 2,6]decane, 4,4'-(1,3-adamantanediyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are preferred, and 2,2-bis(4-hydroxyphenyl)propane, 1,1-bis(4-hydroxyphenyl)cyclohexane, 4,4'-sulfonyldiphenol and 9,9-bis(4-hydroxy-3-methylphenyl)fluorene are particularly preferred. 2,2-bis(4-hydroxyphenyl)propane having excellent strength and high durability is most preferred. They may be used alone or in combination of two or more.

In the carbonate unit represented by the above formula (VII), $R^3$, $R^4$, $R^5$, $R^6$, $R^7$ and $R^8$ are each independently a hydrogen atom, alkyl group having 1 to 12 carbon atoms or substituted or unsubstituted aryl group having 6 to 12 carbon atoms, preferably a hydrogen atom, alkyl group having 1 to 6 carbon atoms or substituted or unsubstituted aryl group having 6 to 12 carbon atoms, and particularly preferably a hydrogen atom, alkyl group having 1 to 12 carbon atoms or phenyl group. $R^9$ and $R^{10}$ are each independently a hydrogen atom, halogen atom, alkyl group having 1 to 10 carbon atoms or alkoxy group having 1 to 10 carbon atoms, preferably a hydrogen atom or alkyl group having 1 to 10 carbon atoms, and particularly preferably a hydrogen atom or alkyl group having 1 to 4 carbon atoms. Compounds exemplified by the following general formula (VIII) are preferably used as a dihydroxyaryl-terminated polydiorganosiloxane (2) which induces the carbonate unit represented by the above formula (VII).

[Chem 8]

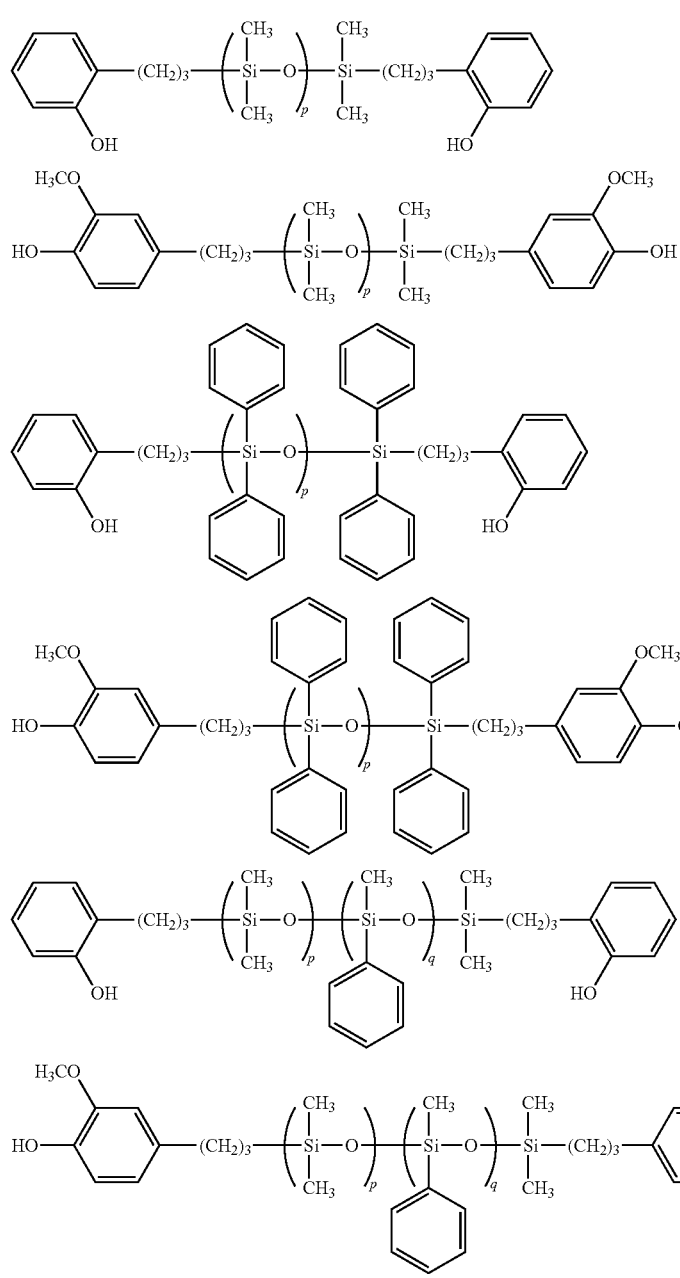

[VIII]

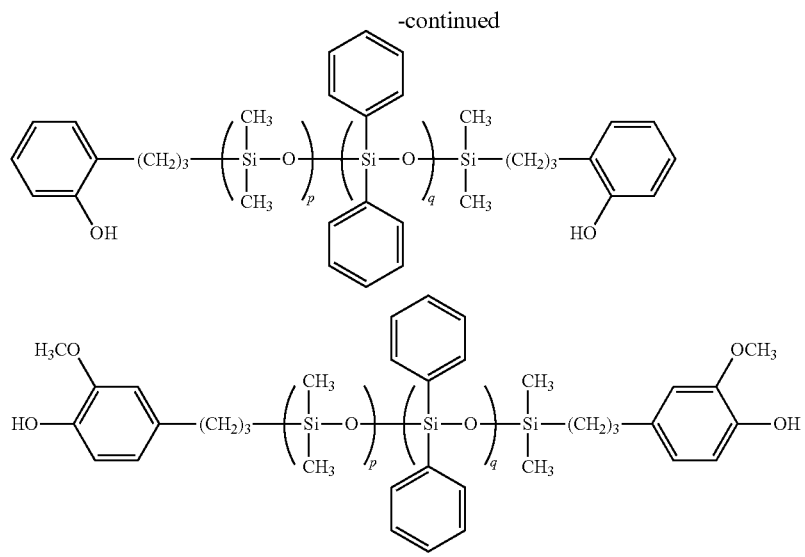

The diorganosiloxane polymerization degree is represented by p and q; p is a natural number, q is 0 or a natural number, and (p+q) is at least 4 and at most 150. "p+q" is preferably 4 to 120, much more preferably 30 to 120, particularly preferably 30 to 100, most preferably 30 to 60.

The content of the polydiorganosiloxane block which is represented by the following general formula (IX) and which is comprised in the above formula (VII) of the present invention is preferably 1.0 to 10.0 wt %, more preferably 2.0 to 10.0 wt %, much more preferably 2.0 to 8.0 wt %, most preferably 3.0 to 8.0 wt %. When the polydiorganosiloxane content is below 1.0 wt %, low-temperature impact resistance and heat stability are not satisfactory, and when the content exceeds 10.0 wt %, poor appearance at the time of the molding and the reduction of heat resistance temperature may occur. The polymerization degree of the polydiorganosiloxane and the content of the polydiorganosiloxane can be calculated by $^1$H-NMR measurement.

[Chem. 9]

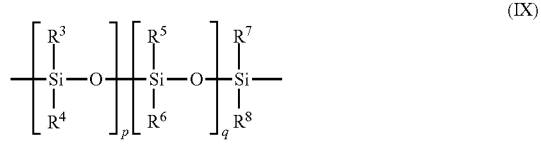

(IX)

(In the above general formula (IX), $R^3$, $R^4$, $R^5$, $R^6$, $R^7$, and $R^8$ are each independently a hydrogen atom, alkyl group having 1 to 12 carbon atoms, or substituted or unsubstituted aryl group having 6 to 12 carbon atoms; p is a natural number; q is 0 or a natural number; p+q is natural number of at least 4 and at most 150.)

Preferably, a polycarbonate polydiorganosiloxane copolymer resin in which polydiorganosiloxane domain having average size of 5 to 18 nm is present in a polycarbonate polymer matrix is used as the polycarbonate polydiorganosiloxane copolymer resin of the component A1 in the present invention. The average size of the polydiorganosiloxane domain is preferably 5 to 15 nm, more preferably 5 to 12 nm, and most preferably 8 to 12 nm. When the average size is below 5 nm, low temperature impact resistance is not fully developed, and when exceeding 18 nm, poor appearance at the time of molding may occur, and therefore not preferable.

The average size of the polydiorganosiloxane domains are evaluated by a small-angle X-ray scattering (SAXS) method. The small-angle X-ray scattering method is a method for measuring diffuse scattering and diffraction produced in a small-angle area having a scattering angle (2θ) of less than 10°. In this small-angle X-ray scattering method, when there are areas having a size of about 1 to 100 nm and a difference in electron density in a substance, the diffuse scattering of X-rays is measured due to the electron density difference. The particle diameter of an object to be measured is obtained based on this scattering angle and scattering intensity. In the case of a polycarbonate-polydiorganosiloxane copolymer resin having an aggregation structure in which polydiorganosiloxane domains are dispersed in the matrix of a polycarbonate polymer, the diffuse scattering of X-rays occurs due to a difference in electron density between the polycarbonate matrix and the polydiorganosiloxane domains. A small-angle X-ray scattering profile is measured by measuring scattering intensity I at each scattering angle (2θ) of less than 10°, and simulation is carried out by using commercially available analyzing software from temporary particle diameter and temporary particle size distribution models based on the assumption that the polydiorganosiloxane domains are spherical domains and there are variations in particle size distribution so as to obtain the average size of the polydiorganosiloxane domains. According to the small-angle X-ray scattering method, the average size of the polydiorganosiloxane domains dispersed in the matrix of the polycarbonate polymer which cannot be accurately measured by observation through a transmission electron microscope can be measured accurately and easily with high reproducibility.

Next, a method for producing the above preferable polycarbonate-polydiorganosiloxane compolymer resin is explained below. A mixed solution of chloroformate compound containing an oligomer comprising a chloroformate of dihydric phenol (1) and/or a dihydric phenol (1) having a terminal chloroformate group is prepared through a reaction between the dihydric phenol (1) and chloroformate-forming compound such as hosgen or chloroformate of dihydric phenol (1) in a mixed solution of a water-insoluble organic solvent and an alkali aqueous solution. Phosgene is preferable as the chloroformate-forming compound.

To produce the oligomer of the dihydric phenol (1), the whole amount of the dihydric phenol (1) which induces the carbonate unit represented by the above general formula [V] may be used to generate the oligomer at a time, or part thereof may be added as a reaction raw material in a post-stage of an interfacial polycondensation reaction as a post-addition monomer. The term "post-addition monomer" means that a monomer is added to accelerate the post-stage of the polycondensation reaction and does not need to be added when not required. The method for the production reaction of the chloroformate compound is not particularly limited but preferably system in which the reaction is carried out in a solvent in the presence of an acid binder. Further, a small amount of an antioxidant such as sodium sulfide or hydrosulfide may be added as desired; the addition of an antioxidant is preferable. The amount of the chloroformate-forming compound may be suitably adjusted in consideration of the stoichiometric ratio (equivalent) of the reaction. When a gaseous chloroformate-forming compound such as phosgene is used, it is preferably blown into the reaction system.

Examples of the acid binder include an alkali metal hydroxide such as sodium hydroxide or potassium hydroxide, an alkali metal carbonate such as sodium carbonate or potassium carbonate, an organic base such as pyridine, or a mixture thereof.

The amount of the acid binder may be suitably determined in consideration of the stoichiometric ratio (equivalent) of the reaction likewise. Stated more specifically, 2 equivalents or a little more of the acid binder is preferably used based on the number of moles (1 mole is generally equivalent to 2 equivalents) of the dihydric phenol (1) used for the formation of the chloroformate compound of the dihydric phenol (1).

As the solvent, solvents which are inactive to reactions such as known solvents used for the production of polycarbonates may be used alone or as a mixture. Typical examples of the solvent include hydrocarbon solvents such as xylene and halogenated hydrocarbon solvents such as methylene chloride and chlorobenzene. Halogenated hydrocarbon solvents such as methylene chloride is preferably used.

Although the reaction pressure for producing the chloroformate compound is not particularly limited and may be normal pressure, increased pressure or reduced pressure, the reaction is advantageously carried out under normal pressure. The reaction temperature is selected from a range of −20 to 50° C., and water cooling or ice cooling is desirably carried out as heat is generated by the reaction in most cases. Although the reaction time is affected by other conditions and cannot be specified unconditionally, it is generally 0.2 to 10 hours.

The pH range of the chloroformate compound production reaction is the same as that of a known interfacial reaction and usually adjusted to not less than 10.

The polycarbonate-polydiorganosiloxane copolymer resin as component A1 of the present invention may be obtained by obtaining a mixed solution of chloroformate compound containing an oligomer comprising a chloroformate of dihydric phenol (1) and a dihydric phenol (1) having a terminal chloroformate group, then adding the hydroxyaryl-terminated polydiorganosiloxane which induces the carbonate unit represented by the general formula [VII] at a rate of not more than 0.01 mol/min based on 1 mol of the charged amount of the dihydric phenol (1) while the mixed solution is stirred so as to carry out the interfacial polycondensation of the hydroxyaryl-terminated polydiorganosiloxane and the chloroformate compound.

A branching agent may be used in combination with the above dihydric phenol-based compound to obtain a branched polycarbonate-polydiorganosiloxane resin, which can be used for the polycarbonate-polydiorganosiloxane copolymer resin as the component A of the present invention. Examples of a polyfunctional aromatic compound having 3 or more functional groups used for the branched polycarbonate-polydiorganosiloxane copolymer resin include phloroglucin, phloroglucide; trisphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α'-dimethylbenzyl phenol; tetra(4-hydroxyphenyl)methane, bis(2,4-dihydroxyphenyl)ketone, 1,4-bis(4,4-dihydroxytriphenylmethyl)benzene or trimellitic acid, pyromellitic acid, benzophenonetetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

Methods for producing the branched polycarbonate-polydiorganosiloxane copolymer resin include a method of adding branching agent in a mixed solution during the production reaction of the chloroformate compound, or the method of adding a branching agent during the interfacial polycondensation reaction after the completion of the production reaction of the chloroformate compound. The percentage of carbonate units derived from the branching agent is, based on the total amount of carbonate units constituting the copolymer resin, preferably 0.005 to 1.5 mol %, more preferably 0.01 to 1.2 mol %, particularly preferably 0.05 to 1.0 mol %. The amount of the branched structure can be calculated by $^1$H-NMR measurement.

The reaction pressure of the polycondensation may be reduced pressure, normal pressure or increased pressure but preferably normal pressure or the pressure of reaction system itself. The reaction temperature is selected from a range of −20 to 50° C., and water cooling or ice cooling is desirably carried out as heat is generated by polymerization in most cases. Since the reaction time differs according to other conditions such as the reaction temperature, it cannot be specified unconditionally but generally 0.5 to 10 hours. According to circumstances, a polycarbonate-polydiorganosiloxane copolymer resin having a desired reduced viscosity $[\eta_{sp}/c]$ may be acquired by carrying out a suitable physical treatment (mixing, fractionating) and/or chemical treatment (polymer reaction, crosslinking, partial decomposition) on the obtained polycarbonate-polydiorganosiloxane copolymer resin. The obtained reaction product (crude product) is subjected to a known post-treatment such as a separation and purification method to collect a polycarbonate-polydiorganosiloxane copolymer resin having a desired purity (degree of purification).

The viscosity average molecular weight (Mv) of the polycarbonate-polydiorganosiloxane copolymer resin used as the component A1 of the present invention is preferably 13,000 to 25,000, more preferably 16,000 to 25,000, much more preferably 18,000 to 25,000, and most preferably 18,000 to 24,000. When the molecular weight exceeds 25,000, moldability may be deteriorate due to high melt viscosity. When the molecular weight is below 13,000, a problem in mechanical strength may occur.

The viscosity average molecular weight of the polycarbonate-polydiorganosiloxane copolymer resin used as the component A1 of the present invention is calculated as follows. A specific viscosity ($\eta_{sp}$) is calculated by the following equation from a solution prepared by dissolving 0.7 g of the polycarbonate-polydiorganosiloxane copolymer resin in 100 ml of methylene chloride at 20° C. with an Ostwald viscometer.

Specific viscosity $(\eta_{sp})=(t-t_0)/t_0$

[$t_0$ is a time (seconds) required for the dropping of methylene chloride and t is a time (seconds) required for the dropping of a sample solution]

The viscosity average molecular weight My is then calculated from the obtained specific viscosity based on the following formula.

$\eta_{sp}/c=[\eta]+0.45\times[\eta]^2 c$ (where [$\eta$] is the intrinsic viscosity)

$[\eta]=1.23\times 10^{-4} Mv^{0.83}$ c=0.7

In 100 wt % of component A, the content of component A1 is 10 to 100 wt %, preferably 30 to 100 wt %, and more preferably 50 to 100 wt %. When the content of component A is equal to or greater than the lower limit, the surface impact properties are suitable.

(Component A2: Aromatic Polycarbonate Resin)

The aromatic polycarbonate resin used as the component A2 of the present invention is usually obtained by reacting a dihydric phenol with a carbonate precursor by interfacial polycondensation, melt transesterification. The aromatic polycarbonate is also obtained by the solid-phase transesterification of a carbonate prepolymer or the ring-opening polymerization of a cyclic carbonate compound. The dihydroxy component as used herein may be any conventionally used dihydroxy component of an aromatic polycarbonate and may be a bisphenol or an aliphatic diol. Examples of the bisphenol include 4,4'-dihydroxybiphenyl, bis (4-hydroxyphenyl) methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenylsulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenylsulfide, 2,2'-diphenyl-4,4'-sulfonyldiphenol, 4,4'-dihydroxy-3,3'-diphenyldiphenylsulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl) tricyclo[5.2.1.02,6]decane, 4,4'-(1,3-adamantandiyl)diphenol, and 1,3-bis(4-hydroxyphenyl)-5,7-dimethyladamantane.

Examples of the aliphatic diol include 2,2-bis-(4-hydroxycyclohexyl)-propane, 1,14-tetradecanediol, octaethylene glycol, 1,16-hexadecanediol, 4,4'-bis(2-hydroxyethoxy)biphenyl, bis{(2-hydroxyethoxy)phenyl}methane, 1,1-bis{(2-hydroxyethoxy)phenyl}ethane, 1,1-bis{(2-hydroxyethoxy)phenyl}-1-phenylethane, 2,2-bis{(2-hydroxyethoxy)phenyl}propane, 2,2-bis{(2-hydroxyethoxy)-3-methylphenyl}propane, 1,1-bis{(2-hydroxyethoxy)phenyl}-3,3,5-trimethylcyclohexane, 2,2-bis{4-(2-hydroxyethoxy)-3,3'-biphenyl}propane, 2,2-bis{(2-hydroxyethoxy)-3-isopropylphenyl}propane, 2,2-bis{3-t-butyl-4-(2-hydroxyethoxy)phenyl}propane, 2,2-bis{(2-hydroxyethoxy)phenyl}butane, 2,2-bis{(2-hydroxyethoxy)phenyl}-4-methylpentane, 2,2-bis{(2-hydroxyethoxy)phenyl}octane, 1,1-bis{(2-hydroxyethoxy)phenyl}decane, 2,2-bis{3-bromo-4-(2-hydroxyethoxy)phenyl}propane, 2,2-bis{3,5-dimethyl-4-(2-hydroxyethoxy)phenyl}propane, 2,2-bis{3-cyclohexyl-4-(2-hydroxyethoxy)phenyl}propane, 1,1-bis{3-cyclohexyl-4-(2-hydroxyethoxy)phenyl}cyclohexane, bis{(2-hydroxyethoxy)phenyl}diphenylmethane, 9,9-bis{(2-hydroxyethoxy)phenyl}fluorene, 9,9-bis{4-(2-hydroxyethoxy)-3-methylphenyl}fluorene, 1,1-bis{(2-hydroxyethoxy)phenyl}cyclohexane, 1,1-bis{(2-hydroxyethoxy)phenyl}cyclopentane, 4,4'-bis(2-hydroxyethoxy)diphenyl ether, 4,4'-bis(2-hydroxyethoxy)-3,3'-dimethyldiphenyl ether, 1,3-bis[2-{(2-hydroxyethoxy)phenyl}propyl]benzene, 1,4-bis[2-{(2-hydroxyethoxy)phenyl}propyl]benzene, 1,4-bis{(2-hydroxyethoxy)phenyl}cyclohexane, 1,3-bis{(2-hydroxyethoxy)phenyl}cyclohexane, 4,8-bis{(2-hydroxyethoxy)phenyl}tricyclo[5.2.1.02,6]decane, 1,3-bis{(2-hydroxyethoxy)phenyl}-5,7-dimethyladamantane, 3,9-bis(2-hydroxy-1,1-dimethylethyl)-2,4,8,10-tetraoxaspiro(5,5) undecane, 1,4:3,6-dianhydro-D-sorbitol (isosorbide), 1,4:3,6-dianhydro-D-mannitol (isomannide), and 1,4:3,6-dianhydro-L-iditol (isoidid).

Among these, an aromatic bisphenol is preferable, and thereamong, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene, and 1,4-bis{2-(4-hydroxyphenyl)propyl}benzene are preferable, and 2,2-bis(4-hydroxyphenyl)propane, 1,1-bis(4-hydroxyphenyl) cyclohexane, 4,4'-sulfonyldiphenol, and 9,9-bis(4-hydroxy-3-methylphenyl)fluorene are particularly preferable. Among these, 2,2-bis(4-hydroxyphenyl)propane, which has excellent strength and suitable durability, is most preferable. Furthermore, these may be used alone or in combinations of two or more.

The aromatic polycarbonate resin used as component A2 of the present invention may be a branched polycarbonate resin using a branching agent in combination with the dihydroxy compound described above. Examples of the trifunctional or higher polyfunctional aromatic compound used in such branched polycarbonate resin include phloroglucin, phloroglucide, trisphenols such as 4,6-dimethyl-2,4,6-tris(4-hydrodiphenyl)heptane-2, 2,4,6-trimethyl-2,4,6-tris(4-hydroxyphenyl)heptane, 1,3,5-tris(4-hydroxyphenyl)benzene, 1,1,1-tris(4-hydroxyphenyl) ethane, 1,1,1-tris(3,5-dimethyl-4-hydroxyphenyl)ethane, 2,6-bis(2-hydroxy-5-methylbenzyl)-4-methylphenol, and 4-{4-[1,1-bis(4-hydroxyphenyl)ethyl]benzene}-α,α-dimethylbenzylphenol, tetra(4-hydroxyphenyl)methane, bis(2,4-dihydroxyphenyl) ketone, 1,4-bis(4,4-dihydroxytriphenylmethyl)benzene, as well as trimellitic acid, pyromellitic acid, benzophenonetetracarboxylic acid, and acid chlorides thereof, and among these, 1,1,1-tris(4-hydroxyphenyl)ethane and 1,1,1-tris(3,5-dimethyl-4-hydroxyphenyl)ethane are preferable, and 1,1,1-tris(4-hydroxyphenyl)ethane is particularly preferable.

These aromatic polycarbonate resin can be produced by a reaction means itself known for the production of conventional aromatic polycarbonate resins, for example, a method in which an aromatic dihydroxy component is reacted with a carbonate precursor such as phosgene or a carbonic acid diester. The basic means of such a production method will be briefly described.

In reactions in which a phosgene is used as the carbonate precursor, for example, the reaction is conventionally performed in the presence of an acid binder and a solvent. For example, an alkali metal hydroxide such as sodium hydroxide or potassium hydroxide or an amine compound such as pyridine is used as the acid binder. For example, a halogenated hydrocarbon such as methylene chloride or chlorobenzene is used as the solvent. Furthermore, a catalyst such as a tertiary amine or a quaternary ammonium salt can be used to promote the reaction. In this case, the reaction temperature is generally 0 to 40° C. and the reaction time is several minutes to 5 hours. The transesterification reaction using a carbonic acid diester as a carbonate precursor is performed by a method in which a predetermined ratio of an aromatic dihydroxy component is stirred with a carbonic acid diester while heating under an inert gas atmosphere to distill off the alcohol or phenol to be produced. The reaction temperature varies depending on the boiling point of the produced alcohol or phenol but is usually in the range of 120 to 300° C. The reaction is completed under reduced pressure from the beginning while distilling off produced alcohols or phenols. A catalyst which is conventionally used in transesterification reactions for reaction promotion can also be used. Examples of the carbonic diester used in the transesterification reaction include diphenyl carbonate, dinaphthyl carbonate, bis(diphenyl)carbonate, dimethyl carbonate, diethyl carbonate, and dibutyl carbonate. Among these, diphenyl carbonate is particularly preferable.

In the present invention, a terminating agent is used in the polymerization reaction. The terminating agent is used for controlling the molecular weight, and, due to the fact that the terminal is blocked, the obtained aromatic polycarbonate resin has superior thermal stability than the one in which the terminal is not blocked. Examples of the terminating agent include monofunctional phenols represented by general formulas [X] to [XII] below.

[Chem. 10]

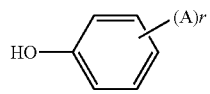

(X)

where A is a hydrogen atom, alkyl group having 1 to 9 carbon atoms, alkylphenyl group (the number of carbon atoms of the alkyl portion is 1 to 9), phenyl group, or phenylalkyl group (the number of carbon atoms of the alkyl portion is 1 to 9), r is an integer of 1 to 5, preferably 1 to 3.

[Chem. 11]

(XI)

-continued

[Chem. 12]

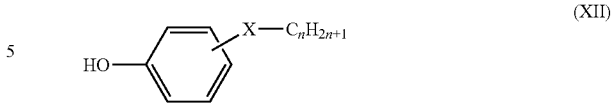

(XII)

where X is —R—O—, —R—CO—O—, or —R—O—CO—, R is a single bond or represents divalent aliphatic hydrocarbon group having 1 to 10, preferably 1 to 5 carbon atoms, and n represents an integer of 10 to 50.

Specific examples of the monofunctional phenols represented by general formula [X] above include phenol, isopropylphenol, p-tert-butylphenol, p-cresol, p-cumylphenol, 2-phenylphenol, 4-phenylphenol, and isooctylphenol. The monofunctional phenols represented by general formulas [XI] to [XII] above are phenols having a long-chain alkyl group or aliphatic ester group as a substituent. When these are used to block the ends of the aromatic polycarbonate resin, not only do they function as terminating agents or molecular weight regulators, but they also improve the melt fluidity of the resin, whereby not only the effect of facilitating the molding process, but also the effect of reducing the water absorption of resin are brought about. Thus, they are preferably used. In the monofunctional phenol of general formula [XI] above, n is preferably 10 to 30, and particularly preferably 10 to 26, and specific examples thereof include decylphenol, dodecylphenol, tetradecylphenol, hexadecylphenol, octadecylphenol, eicosylphenol, docosylphenol and triacontylphenol. As the monofunctional phenol represented by general formula [XII] above, compounds in which X is —R—CO—O— and R is a single bond are suitable, compounds in which n is 10 to 30, and in particular 10 to 26 are preferable, and specific examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate. Among these monofunctional phenols, monofunctional phenols represented by general formula [X] above are preferable, alkyl-substituted or phenylalkyl-substituted phenols are more preferable, and p-tert-butylphenol, p-cumylphenol and 2-phenylphenol are particularly preferable. It is desirable that these monofunctional phenol terminating agents be introduced into at least 5 mol %, and preferably at least 10 mol %, of the terminals of the obtained aromatic polycarbonate resin, and terminating agents may be used alone or in combination of two or more.

The aromatic polycarbonate resin used as component A2 of the present invention may be a polyester carbonate copolymerized with an aromatic dicarboxylic acid such as terephthalic acid, isophthalic acid, naphthalenedicarboxylic acid or a derivative thereof within the range in which the effect of the present invention is not inhibited thereby.

The viscosity-average molecular weight of the aromatic polycarbonate resin used as component A2 of the present invention is not limited. However, when the viscosity-average molecular weight is less than 10,000, strength is reduced, and when it exceeds 50,000, the mold-processing characteristics are reduced, and thus, a range of 10,000 to 50,000 is preferable, a range of 12,000 to 30,000 is more preferable, and a range of 15,000 to 28,000 is further preferable. Regarding the viscosity-average molecular weight as used herein, the specific viscosity according to the following equation is calculated by using an Ostwald viscometer from a solution of 0.7 g of aromatic polycarbonate resin dissolved in 100 ml of methylene chloride at 20° C., and then the viscosity-average molecular weight Mv is determined by inserting the determined specific viscosity into the following equation.

$$\text{specific viscosity } (\eta_{sp})=(t-t_0)/t_0$$

[$t_0$ is a time (seconds) required for the dropping of methylene chloride and t is a time (seconds) required for the dropping of a sample solution]

$$\eta_{sp}/c=[\eta]+0.45\times[\eta]^2 c \text{ (where [\eta] is the intrinsic viscosity),}$$

$[\eta]=1.23\times10^{-4}\text{Mv}^{0.83}$, and
c=0.7

The total amount of Cl (chlorine) in the aromatic polycarbonate resin used as component A2 of the present invention is preferably 0 to 200 ppm, and more preferably 0 to 150 ppm. When the total amount of Cl in the aromatic polycarbonate resin exceeds 200 ppm, color and thermal stability become worse, which is not preferable.

The content of component A2 is 0 to 90 parts by weight, preferably 0 to 70 parts by weight, more preferably 0 to 50 parts by weight, of the total 100 parts by weight of component A.

<Component B: Polyester Resin>

The polyester resin (component B) is a polymer or copolymer obtained by condensation reaction using an aromatic dicarboxylic acid or a reactive derivative thereof and a diol or an ester derivative thereof as primary components.

Examples of aromatic dicarboxylic acids include aromatic dicarboxylic acids such as terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenyl methane dicarboxylic acid, 4,4'-biphenyl sulfone dicarboxylic acid, 4,4'-biphenyl isopropylidene dicarboxylic acid, 1,2-bis (phenoxy)ethane-4,4'-dicarboxylic acid, 2,5-anthracenedicarboxylic acid, 2,6-anthracenedicarboxylic acid, 4,4'-p-terphenylenedicarboxylic acid, and 2,5-pyridinedicarboxylic acid. Additional examples include diphenylmethane dicarboxylic acid, diphenyl ether dicarboxylic acid, and p-hydroxyethoxybenzoic acid. It is particularly preferable that terephthalic acid or 2,6-naphthalenedicarboxylic acid be used. Two or more aromatic dicarboxylic acids may be used as a mixture. If the amount thereof is small, it is also possible to use, together with the dicarboxylic acid, one or more of aliphatic dicarboxylic acids such as adipic acid, azelaic acid, sebacic acid and dodecane diacid, alicyclic dicarboxylic acids such as cyclohexane dicarboxylic acid as a mixture.

Examples of diols include aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol, and triethylene glycol. Additional examples include alicyclic diols such as 1,4-cyclohexanedimethanol. Diols containing an aromatic ring, such as 2,2-bis (β-hydroxyethoxyphenyl) propane, and mixtures thereof may also be used. Further, one or more of long-chain diols having a molecular weight of 400 to 6,000, for example, polyethylene glycol, poly-1,3-propylene glycol, or polytetramethylene glycol, may be copolymerized therewith in small amount.

The polyester resin (component B) can be branched by introducing a small amount of a branching agent. The type of the branching agent is not limited, and examples thereof include trimesic acid, trimellitic acid, trimethylolethane, trimethylolpropane, and pentaerythritol.

Examples of the polyester resin (component B) include polyethylene terephthalate (PET), polytrimethylene terephthalate, polybutylene terephthalate (PBT), polyhexylene terephthalate, polyethylene naphthalate (PEN), polybutylene naphthalate (PBN), and polyethylene-1,2-bis (phenoxy) ethane-4,4'-dicarboxylate. Additional examples include copolyester resins such as polyethylene isophthalate/terephthalate and polybutylene terephthalate/isophthalate. Among these, polyethylene terephthalate, polybutylene terephthalate, polyethylene naphthalate, polybutylene naphthalate, and mixtures thereof, which have well-balanced mechanical properties, can preferably be used.

Further, the terminal group structure of the polyester resin (component B) is not particularly limited. The ratios of terminal hydroxyl and carboxyl groups may be almost the same. Additionally, one of the terminal hydroxyl groups and the carboxyl groups may have larger percentage than the other. Furthermore, the terminal group may be sealed by reacting a compound which can react with the terminal group.

The polyester resin (component B) is preferably produced by polymerizing the dicarboxylic acid component and the diol component, while heating, in the presence of a specific titanium catalyst in accordance with a conventional method, and thereafter discharging out of the system by-produced water and lower alcohols.

The specific titanium catalyst will be described in detail below. The specific titanium catalyst is a titanium-phosphorus catalyst which is obtained from the reaction product of a titanium compound as described below and a phosphorus compound as described below.

The titanium compound is the titanium compound (1) represented by formula (I) shown below or is the titanium compound (2) obtained by reacting the titanium compound (I) and an aromatic polycarboxylic acid represented by formula (II) below or an anhydride thereof.

[Chem. 13]

(I)

where $R^1$, $R^2$, $R^3$, and $R^4$ each independently represent alkyl group having 2 to 10 carbon atoms, k represents an integer of 1 to 3, and when k is 2 or 3, two or three of $R^3$ and $R^4$ may be identical or may be different. Examples of the alkyl group include an ethyl group, propyl group, butyl group, pentyl group, hexyl group, octyl group, and decyl group.

Examples of titanium compound (1) include titanium tetraalkoxides such as titanium tetrabutoxide, titanium tetraisopropoxide, titanium tetrapropoxide, and titanium tetraethoxide, octaalkyl trititanates such as octamethyl trititanate, octaethyl trititanate, octaisopropyl trititanate, octanormal propyl trititanate, and octabutyl trititanate, alkyl titanates such as hexamethyl dititanate, hexaethyl dititanate, hexaisopropyl dititanate, hexanormal propyl dititanate, hexabutyl dititanate, and hexaalkyl dititanate. Among these, titanium tetraalkoxide, which has suitable reactivity with the phosphorus compound, is preferable, and titanium tetrabutoxide is particularly preferable.

(Titanium Compound (2))

Titanium compound (2) is a reaction product of the titanium compound (I) and the aromatic polycarboxylic acid represented by formula (II) or an anhydride thereof.

[Chem 14]

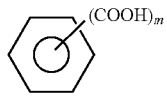
(II)

where m represents an integer of 2 to 4. Phthalic acid, trimellitic acid, hemimellitic acid, pyromellitic acid and anhydrides thereof are preferable as the aromatic polycarboxylic acid represented by formula (II) or anhydride thereof. In particular, trimellitic acid anhydride, which has suitable reactivity with titanium compound (1) and yields a polycondensed catalyst having high affinity with the polyester, is more preferably used.

The reaction between titanium compound (1) and the aromatic polycarboxylic acid of formula (II) or the anhydride thereof is preferably carried out by mixing the aromatic polycarboxylic acid or anhydride thereof in a solvent, dissolving a part or all thereof in the solvent, and dropping titanium compound (1) into the mixed solution. The reaction is preferably heated at a temperature of 0° C. to 200° C. for 30 minutes or more, preferably at a temperature of 30 to 150° C. for 40 to 90 minutes. The reaction pressure in this case is not particularly limited, and normal pressure is sufficient. Though the solvent can be appropriately selected from among those capable of dissolving part or all of the required amount of the compound of formula (II) or the anhydride thereof, it is preferably selected from ethanol, ethylene glycol, trimethylene glycol, tetramethylene glycol, benzene and xylene, and the like.

The reaction molar ratio of the titanium compound (1) to the compound represented by formula (II) or anhydride thereof is not limited. However, if the proportion of the titanium compound (1) is excessively high, the color of the obtained polyester resin may be deteriorated or the softening point may be lowered, and conversely, if the proportion of the titanium compound (1) is excessively low, it may be difficult for the polycondensation reaction to proceed. Thus, the reaction molar ratio of the titanium compound (1) to the compound of formula (II) or anhydride thereof is preferably controlled within the range of 2/1 to 2/5. The reaction product obtained by this reaction may be directly reacted with the aforementioned phosphorus compound, or it may be purified by recrystallization using a solvent comprising of acetone, methyl alcohol and/or ethyl acetate or the like, and thereafter reacted with the phosphorus compound.

(Phosphorus Compound)

The phosphorus compound is represented by the following formula (III).

[Chem. 15]

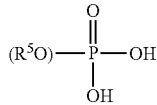
(III)

where $R^5$ represents a substituted or unsubstituted aryl group having 6 to 20 carbon atoms, or alkyl group having 1 to 20 carbon atoms. Examples of the aryl group include a phenyl group and a naphthyl group. Examples of the alkyl group include methyl group, ethyl group, propyl group, butyl group, pentyl group, hexyl group, octyl group, decyl group, undecyl group, dodecyl group, tridecyl group, tetradecyl group, pentadecyl group, hexadecyl group, and didecyl group (R20). Carboxyl group, alkyl group, hydroxyl group, or amino group can be used as a substituent of an aryl group or an alkyl group.

The phosphorus compound includes a monoalkyl phosphate and a monoaryl phosphate. Examples thereof include monomethyl phosphate, monoethyl phosphate, monotrimethyl phosphate, mono-n-butyl phosphate, monohexyl phosphate, monoheptyl phosphate, monooctyl phosphate, monononyl phosphate, monodecyl phosphate, monododecyl phosphate, monolauryl phosphate, monooleyl phosphate, monotetradecyl phosphate, monophenyl phosphate, monobenzyl phosphate, mono(4-dodecyl)phenyl phosphate, mono(4-methylphenyl)phosphate, mono(4-ethylphenyl) phosphate, mono(4-propylphenyl)phosphate, mono(4-dodecylphenyl)phosphate, monotolyl phosphate, monoxylyl phosphate, monobiphenyl phosphate, and mononaphthyl phosphate and monoanthryl phosphate. These may be used alone or as a mixture of two or more, for example, as a mixture of monoalkyl phosphate and monoaryl phosphate. However, when the phosphorus compound is used as a mixture of two or more, the ratio of the monoalkyl phosphate is preferably 50% or more, more preferably 90% or more, and more preferably 100%.

(Reaction of Titanium Compound and Phosphorus Compounds)

The titanium-phosphorus catalyst is a reaction product of the above titanium compound and the above phosphorus compound. The polyester resin produced using the titanium-phosphorus catalyst is superior in moisture and heat resistance and thermal stability as compared to the case of using germanium, antimony or another titanium-based catalyst. In the case of polymerization using a titanium-phosphorus catalyst having a high catalytic activity, the amount of additives such as a hue stabilizer and a thermal stabilizer added at the time of production is smaller than that in the case of using another catalyst, and since the amount of impurities and by-products is also smaller, the quality is further improved and stabilized. Thus, decomposition of the additive in a wet heat environment or a thermal environment as well as the influence of impurities and by-products are reduced, whereby it is presumed that excellent moisture and heat resistance and thermal stability can be obtained.

In the titanium-phosphorus catalyst, the reaction molar ratio (mTi/mP) of the titanium atom equivalent molar amount (mTi) of the titanium compound to the phosphorus atom equivalent molar amount (mP) of the phosphorus compound is preferably in the range of 1/3 to 1/1, more preferably in the range of 1/2 to 1/1.

The titanium atom equivalent molar amount of the titanium compound is the total value of the products each of which is obtained by multiplying the molar amount of each titanium compound contained in the titanium compound by the number of titanium atoms per molecule thereof. The phosphorus atom equivalent molar amount of the phosphorus compound is the total value of the products each of which is obtained by multiplying the molar amount of each phosphorus compound contained in the phosphorus compound by the number of phosphorus atoms per molecule thereof. However, since the phosphorus compound represented by the above formula (III) contains one phosphorus atom per molecule, the phosphorus atom equivalent molar amount is equal to the molar amount of the phosphorus compound.

If the reaction molar ratio (mTi/mP) is greater than 1/1, i.e., if the amount of the titanium compound is excessive, the color tone of the polyester resin obtained using the obtained catalyst may be poor (b value is excessively high), and the heat resistance of the polyester resin may be reduced. Furthermore, when the reaction molar ratio (mTi/mP) is less than 1/3, i.e., when the amount of the titanium compound is excessively small, the catalytic activity of the obtained catalyst for the polyester-forming reaction may be insufficient.

The titanium-phosphorus catalyst is prepared, for example, by mixing a phosphorus compound of the above formula (III) and a solvent, dissolving a part or all of the phosphorus compound in the solvent, and dropping the titanium compound (1) or (2) into the mixed solution. The reaction is preferably carried out by heating at a temperature of 50° C. to 200° C., more preferably 70° C. to 150° C., for preferably 1 minute to 4 hours, more preferably 30 minutes to 2 hours. In this reaction, the reaction pressure is not particularly limited, and the reaction may be carried out under pressure (0.1 to 0.5 MPa), under normal pressure, or under reduced pressure (0.001 to 0.1 MPa), but it is generally carried out under normal pressure.

The solvent of the phosphorus compound of the above formula (III) used in the reaction is not particularly limited as long as it can dissolve at least a part of the phosphorus compound, and for example, a solvent composed of at least one type selected from ethanol, ethylene glycol, trimethylene glycol, tetramethylene glycol, benzene, and xylene is preferably used. In particular, as a solvent, it is preferable to use the same compound as the glycol component constituting the polyester to be ultimately obtained.

The reaction product of the titanium compound and the phosphorus compound may be separated from the reaction system by means such as centrifugal precipitation or filtration, and then used as a catalyst for producing a polyester resin without purification, or the separated reaction product may be purified by recrystallization with a recrystallizing agent such as acetone, methyl alcohol, and/or water, and the purified product obtained thereby may be used as the catalyst. Alternatively, the reaction product-containing reaction mixture may be used as-is as a catalyst-containing mixture without separating the reaction product from the reaction system.

As the titanium-phosphorus catalyst, a reaction product of a compound represented by the above formula (I) (where k represents 1), i.e., a reaction product of a titanium tetraalkoxide and the phosphorus compound of the above formula (III) is preferably used as the catalyst.

Further, a compound represented by the following formula (IV) is preferably used as the titanium-phosphorus catalyst.

[Chem. 16]

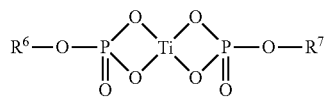

(IV)

where $R^6$ and $R^7$ each independently represent alkyl group having 2 to 12 carbon atoms or aryl group having 6 to 12 carbon atoms. Examples of the alkyl group having 2 to 12 carbon atoms include ethyl groups, propyl groups, butyl groups, pentyl groups, hexyl groups, octyl groups, and decyl groups. Examples of the aryl group having 6 to 12 carbon atoms include phenyl groups and naphthyl groups.

The titanium-phosphorus catalyst represented by the above formula (IV) has a high catalytic activity, and the polyester resin produced using the same has a good color tone (low b value), a practically sufficient level of low content of acetaldehyde, residual metal and cyclic trimer of an ester of an aromatic dicarboxylic acid and an alkylene glycol, and a sufficient polymer performance in practical use.

The catalyst preferably contains 50% by mass or more of the compound of the above formula (IV), more preferably 70% by mass or more.

The amount of the titanium-phosphorus catalyst used is preferably an amount of 2 to 40%, more preferably 5 to 35%, and even more preferably 10 to 30% in terms of millimoles of titanium atoms, based on the total millimoles of the aromatic dicarboxylic acid component contained in the polymerization starting material. If this amount is less than 2%, the accelerating effect of the catalyst on the polycondensation reaction of the polymerization starting material becomes insufficient, the polyester production efficiency becomes insufficient, and a polyester resin having a desired degree of polymerization may not be obtained. If the amount exceeds 40%, the color tone (b value) of the obtained polyester resin becomes insufficient and becomes yellowish, whereby the usefulness thereof may be reduced.

The process for producing alkylene glycol esters of aromatic dicarboxylic acids and/or low polymers thereof is not particularly limited, but they are usually produced by a heating reaction of an aromatic dicarboxylic acid or ester-formig derivative thereof with an alkylene glycol or ester-forming derivative thereof. For example, ethylene glycol esters of terephthalic acid and/or low polymers thereof used as raw materials for polyethylene terephthalate are produced by direct esterification reaction of terephthalic acid and ethylene glycol, or by transesterification reaction of lower alkyl esters of terephthalic acid and ethylene glycol, or by addition reaction of ethylene oxide to terephthalic acid. The alkylene glycol ester of the aromatic dicarboxylic acid and/or the low polymer thereof may contain another dicarboxylic acid ester which is copolymerizable therewith as an additional component in an amount within a range in which the effect of the method of the present invention is not substantially impaired. Specifically, it may be contained in an amount within a range of 10 mol % or less, preferably 5 mol % or less, based on the total molar amount of the acid component.

The copolymerizable additional component is selected from esters of an acid component and a glycol component or anhydrides thereof. The acid component may be one or more selected from aliphatic and cycloaliphatic dicarboxylic acids such as adipic acid, sebacic acid and 1,4-cyclohexanedicarboxylic acid; and hydroxycarboxylic acids such as β-hydroxyethoxybenzoic acid and p-oxybenzoic acid. Examples of the glycol component include alkylene glycols having two or more carbon atoms, 1,4-cyclohexanedimethanol, neopentyl glycol, bisphenol A, bisphenol S, other aliphatic, cycloaliphatic, aromatic diol compounds, and polyoxyalkylene glycols. The above-mentioned additional component esters may be used alone, or two or more types thereof may be used in combination. However, it is preferable that the copolymerization amount be within the above range.

When a terephthalic acid and/or dimethyl terephthalate are used as starting materials, the recovered dimethyl terephthalate obtained by depolymerization of polyalkylene terephthalate or the recovered terephthalic acid obtained by hydrolysis thereof may be used in an amount of 70% by mass or more based on the mass of all acid components constituting the polyester. In this case, it is preferable that the polyalkylene terephthalate be polyethylene terephthalate, and in particular, it is preferable from the viewpoint of effective utilization of resources to use recovered PET bottles, recovered fiber products, recovered polyester film products, and, furthermore, polymer scraps generated in the manufacturing process of these products as raw material sources for polyester production. The method of depolymerizing the recovered polyalkylene terephthalate to obtain dimethyl terephthalate is not particularly limited, and any conventionally known method can be employed. For example, after depolymerization of the recovered polyalkylene terephthalate using ethylene glycol, the depolymerized product is subjected to a transesterification reaction with a lower alcohol, for example, methanol, and the reaction mixture is then purified to recover a lower alkyl ester of terephthalic acid, which is subjected to a transesterification reaction with an alkylene glycol, and then the obtained phthalic acid/alkylene glycol ester is polycondensed to obtain a polyester resin. The method of recovering terephthalic acid from the recovered dimethyl terephthalate is not particularly limited, and any conventional method may be used. For example, dimethyl terephthalate can be recovered from the reaction mixture obtained by the transesterification reaction by a recrystallization method and/or a distillation method, and thereafter hydrolyzed by heating with water under high temperature and high pressure to recover terephthalic acid. The total content of 4-carboxybenzaldehyde, paratoluic acid, benzoic acid, and dimethyl hydroxyterephthalate in the impurities contained in terephthalic acid obtained by this method is preferably 1 ppm or less. The content of monomethyl terephthalate is preferably in the range of 1 to 5000 ppm. The polyester resin can be produced by directly esterifying the terephthalic acid recovered by the above method and alkylene glycol and by polycondensing the obtained ester.

In the polyester resin (component B), the catalyst may be added to the polymerization starting material at any stage before the start of the polycondensation reaction of the aromatic dicarboxylic acid alkylene glycol ester and/or its lower polymer, and the method of addition is not limited. For example, an aromatic dicarboxylic acid alkylene glycol ester may be prepared and a solution or slurry of the catalyst may be added to the reaction system to initiate the polycondensation reaction, or a solution or slurry of the catalyst may be added to the reaction system with or after the starting material is charged when preparing the aromatic dicarboxylic acid alkylene glycol ester.

The production reaction conditions of the polyester resin (component B) are not particularly limited. In general, polycondensation reactions are preferably polycondensed for 15 to 300 minutes at temperatures of 230 to 320° C., at atmospheric pressure, or under reduced pressure (0.1 Pa to 0.1 MPa), or combinations of these conditions.

In the polyester resin (component B), a reaction stabilizer, for example, trimethyl phosphate, may be added to the reaction system as necessary at any stage in the polyester production. If necessary, one or more of an antioxidant, an ultraviolet absorber, a flame retardant, a fluorescent brightener, a matting agent, a coloring agent, an antifoaming agent, and other additives may be added to the reaction system. In particular, the polyester resin preferably contains an antioxidant containing at least one hindered phenol compound. The content thereof is preferably 1 mass % or less with respect to the mass of the polyester resin. If the content exceeds 1% by mass, thermal degradation of the antioxidant itself may cause inconvenience of deteriorating the quality of the obtained product.

Examples of the hindered phenolic compound include pentaerythritol-tetrakis[3-(3,5-di-tert-butyl-4-hydroxyphenyl)propionate] and 3,9-bis{2-[3-(3-tert-butyl-4-hydroxy-5-methylphenyl)propionyloxy]-1,1-dimethylethyl}-2,4,8,10-tetraoxaspiro[5,5]undecan. It is also preferable that these hindered phenolic antioxidants be used in combination with a thioether secondary antioxidant. The method of adding the hindered phenolic antioxidant to the polyester resin is not particularly limited but it is preferably added at any stage after the a transesterification reaction or the esterification reaction is completed and before the polymerization reaction is completed.

Further, in order to finely adjust the color tone of the obtained polyester resin, a coloring agent composed of one or more selected from azo-based, triphenylmethane-based, quinoline-based, anthraquinone-based, and phthalocyanine-based organic blue pigments and inorganic blue pigments can be added to the reaction system in the stage in which the polyester resin is produced. It is not necessary to use an inorganic blue pigment containing cobalt or the like as a coloring agent, which lowers the melt thermal stability of the polyester resin. Thus, the polyester resin used in the present invention is substantially free of cobalt.

The polyester resin (component B) preferably contains from 0.001 to 50 ppm of elemental titanium, more preferably from 1 to 45 ppm, further preferably from 1 to 30 ppm, and most preferably from 2 to 20 ppm. If the content of the titanium element is more than 50 ppm, thermal stability and hue may be deteriorated. If the amount of the titanium element is less than 0.001 ppm, the residual amount of the catalyst of the polyester resin used is considerably lower than that of the polyester resin, whereby the production of the polyester resin becomes difficult, and, excellent mechanical strength, moisture/heat resistance, and thermal stability, which are characteristics of the present composition, may not be obtained.

Conventionally, the polyester resin (component B) preferably has an L value of 80.0 or more and a b value in the range of −2.0 to 5.0 obtained from a Hunter-type color difference meter. When the L value of the polyester resin is less than 80.0, the degree of whiteness of the obtained polyester resin is low, whereby a practically-useful high-whiteness molded product may not be obtained. When the b value is less than −2.0, the obtained polyester resin has little yellowness, but bluish tinge increases, and when the b value exceeds 5.0, the obtained polyester resin has strong yellowness, whereby a practically-useful molded article may not be produced. The L value of the polyester resin obtained by the method of the present invention is more preferably 82 or more, particularly preferably 83 or more, and the range of the b value is more preferably −1.0 to 4.5, particularly preferably 0.0 to 4.0.

The intrinsic viscosity of the polyester resin (component B) is not limited but is preferably in the range of 0.30 to 1.5. If the intrinsic viscosity falls within this range, melt molding is easy and the strength of the molded product obtained therefrom is high. The range of the intrinsic viscosity is more preferably 0.40 to 1.2, particularly preferably 0.50 to 1.0.

The intrinsic viscosity of the polyester resin is measured at a temperature of 35° C. by dissolving the polyester resin in orthochlorophenol. The polyester resin obtained by solid phase polycondensation is generally used for bottles and the like in many cases and has an intrinsic viscosity of 0.70 to 0.90 in many cases. It is preferable that the content of the cyclic trimer of the ester of the aromatic dicarboxylic acid and alkylene glycol be 0.5 wt % or less, and the content of acetaldehyde be 5 ppm or less. The cyclic trimers include alkylene terephthalates, such as ethylene terephthalate, trimethylene terephthalate, tetramethylene terephthalate, and hexamethylene terephthalate, as well as alkylene naphthalates, such as ethylene naphthalate, trimethylene naphthalate, tetramethylene naphthalate, and hexamethylene naphthalate.

The content of component B is 1 to 70 parts by weight, preferably 5 to 50 parts by weight, more preferably 10 to 40 parts by weight, of the total 100 parts by weight of component A and component B. When the content thereof is equal to or greater than the lower limit, an effect of improving chemical resistance is observed, and when it is equal to or less than the upper limit, the impact resistance is suitable.

<Component C; Filler Surface-Treated with Silane Coupling Agent Containing Alkyl Group>

The resin composition of the present invention contains a filler which has been surface-treated with a silane coupling agent containing an alkyl group as a component C. As the filler of component C, a conventional well-known filling material can be used. However, the filler suitably used is an inorganic filler having an average particle size (D50 (median diameter of particle size distribution)) as measured by laser diffraction and scattering of 0.1 to 300 μm or 1 to 100 μm. Specifically, examples of the filler of component C include at least one filler selected from the group consisting of talc, mica, and Wollastonite.

(C-1) Talc

In the context of the present invention, talc is hydrous magnesium silicate in terms of chemical composition, generally represented by the chemical formula $4SiO_2 \cdot 3MgO \cdot 2H_2O$ and a flaky particle having a lamellar structure. In terms of the composition, talc comprises 56 to 65 wt % of $SiO_2$, 28 to 35 wt % of MgO and about 5 wt % of $H_2O$. As other trace components, it comprises 0.03 to 1.2 wt % of $Fe_2O_3$, 0.05 to 1.5 wt % of $Al_2O_3$, 0.05 to 1.2 wt % of CaO, not more than 0.2 wt % of $K_2O$ and not more than 0.2 wt % of $Na_2O$. As a more suitable composition of talc, $SiO_2$: 62 to 63.5 wt %, MgO: 31 to 32.5 wt %, $Fe_2O_3$: 0.03 to 0.15 wt %, $Al_2O_3$: 0.05 to 0.25 wt %, and CaO: 0.05 to 0.25 wt % are preferred. Further, it is preferable that the loss on ignition be 2 to 5.5 wt %. Due to such a preferred composition, a resin composition having suitable thermal stability and hue is obtained, and a suitable molded article can be produced by further increasing the molding processing temperature. As a result, the composition of the present invention can be made to have a higher fluidity and can be applied to a thin-walled molded articles having a larger size or a complicated shape.

As for the particle diameter of talc, the average particle diameter measured by a sedimentation method is preferably 0.1 to 50 m (more preferably 0.1 to 10 m, much more preferably 0.2 to 5 m, particularly preferably 0.2 to 3.5 m). Thus, Talc having the above preferable composition and having average particle diameter of 0.1 to 50 m is preferable used in the present invention. Further, it is particularly preferable to use talc having a bulk density of 0.5 g/cm³ or more as a raw material. Examples of talcs satisfying such a condition include "Upn HS-T0.8" manufactured by Hayashi Kasei Co., Ltd. The average particle diameter of talc is D50 (median diameter in particle size distribution) measured by an X-ray transmission method which is one of liquid-phase sedimentation methods. Examples of the apparatus used for this measurement include the Sedigraph5100 of Micromeritics.

The method of milling talc ore is not particularly limited, and axial-flow milling, annular milling, roll milling, ball milling, jet milling and container rotation type compression shearing milling methods may be used. Further, talc which has been classified by a classifier to become uniform in particle size distribution after milling is preferred. The classifier is not particularly limited and may be an impactor type inertia force classifier (such as variable impactor), Coanda effect-use inertia force classifier (such as elbow jet), or centrifugal classifier (such as multi-stage cyclone separator, microplex classifier, dispersion separator, accucut classifier, turbo classifier, turboplex classifier, micron separator or super separator).

Further, talc which is agglomerated is preferred from the viewpoint of handling ease, and production processes thereof include one making use of deaeration compression and one making use of compression by using a sizing agent. The process making use of deaeration compression is particularly preferred because it is simple and prevents an unrequired sizing agent resin component from being contained in the resin composition of the present invention.

(C-2) Mica

The mica preferably has an average particle size of 5 to 250 μm. Furthermore, the mica preferably has an average particle size (D50 (the median diameter of the particle size distribution)) as measured by laser diffraction and scattering of 5 to 50 μm. If the average particle diameter of mica is less than 5 μm, the effect of improving the rigidity is unlikely to be obtained. Conversely, a resin composition containing mica having an average particle size exceeding 250 μm may tend to be inferior in appearance and flame retardancy while having saturated mechanical properties. The average particle diameter of the mica is measured by laser diffraction and scattering or by vibrating sieving. Laser diffraction and scattering is preferably performed on a mica having a 325-mesh pass of 95 wt % or more by vibrating sieving. For mica of larger particle sizes, it is common to use vibrating sieving. In the vibrating sieving method of the present invention, first, 100 g of the mica powder to be used is sieved using a vibrating screener for 10 minutes using a standard JIS standard screen in which openings are sequentially stacked. This is a method of determining the particle size distribution by measuring the weight of the powder remaining on each sieve.

Mica having a thickness actually measured by observation through an electron microscope of 0.01 to 1 m may be preferably used. The thickness is more preferably 0.03 to 0.3 m. The aspect ratio of mica is preferably 5 to 200, more preferably 10 to 100. Mica in use is preferably muscovite mica having a Mohs hardness of about 3. Muscovite mica has higher stiffness and higher strength than other mica such as phlogopite mica and attains the object of the present invention at a higher level. Thus, in the present invention, muscovite having average particle diameter of 5 to 250 m, more preferably of 5 to 50 m, is preferably used as mica. Preferable examples of mica include "A-21" manufactured by Yamaguchi Ummo KogyoSho, and "KWM-200" manufactured by Kinseimatech Corporation. As the method of milling mica, both dry and wet milling methods may be employed. The dry milling method is inexpensive and commonly used whereas the wet milling method is effective in milling mica finely and thinly (the effect of improving the rigidity of the resin composition is higher). In the present invention, mica milled by wet milling methods is more preferable.

(C-3) Wollastonite

The fiber diameter of wollastonite is preferably 0.1 to 10 m more preferably 0.1 to 5 m, much more preferably 0.1 to 3 m. The aspect ratio (average fiber length/average fiber diameter) of wollastonite is preferably not less than 3. The upper limit of the aspect ratio is not more than 30. As for the fiber diameter, a reinforcing filler is observed through an electron microscope to obtain the diameter of each fiber so as to calculate a number average fiber diameter from the measurement values. The reason for the use of the electron microscope is that it is difficult to measure the size with desired accuracy with an optical microscope. Fillers to be measured for fiber diameter are chosen at random from an image obtained by observing through the electron microscope to measure each fiber diameter at a position close to the center part so as to calculate a number average fiber diameter from the obtained measurement values. The magnification for observation is about 1,000×, and the number of fibers to be measured is not less than 500 (preferably not more than 600 from the viewpoint of work efficiency). As for the measurement of the average fiber length, the fillers are observed through an optical microscope to obtain the length of each fiber so as to calculate a number average fiber length from the measurement values. For observation through the optical microscope, a sample in which fillers are dispersed so well that they do not overlap with one another is first prepared. Observation is carried out with a 20-power objective lens, and this observed image is input into a CCD camera having about 250,000 pixels as image data. The fiber length is calculated from this obtained image data by using an image analyzing apparatus and a program for obtaining the maximum distance between two points of the image data. Under the above conditions, the size of each pixel corresponds to a length of 1.25 m, and the number of the measured fibers is not less than 500 (preferably not more than 600 from the viewpoint of work efficiency). It is preferred that iron contained in the raw material ore and iron contained by the abrasion of the apparatus when the raw material ore is milled should be removed as much as possible by a magnetic ore separator in order to fully reflect the whiteness of wollastonite upon the resin composition. The iron content of wollastonite is preferably reduced to not more than 0.5 wt % in terms of $Fe_2O_3$ by the magnetic ore separator. Thus, the more preferred Wollastonite has a fiber diameter of 0.1 to 10 μm, a mean particle diameter of 5 to 250 μm, and an iron content of 0.5 wt % or less in terms of $Fe_2O_3$. Examples of such a suitable Wollastonite include "SH-1250" and "SH-1800" manufactured by Kinseimatech Corporation, KGP-H40 manufactured by Kansai Matech Corporation, and "NYGLOS4W" manufactured by NYCO Corporation.

The filler in the present invention is a filler which has been surface-treated with a silane coupling agent containing an alkyl group. An example of the silane coupling agent containing an alkyl group is $R_{an}Si(OR_b)_{4-n}$ (where $R_a$ and $R_b$ are each a $C_{1-30}$ alkil group, and n is an integer of 0 to 4; preferably $R_a$ is a $C_{5-25}$ alkyl group, $R_b$ is a $C_{1-5}$ alkyl group, and n is an integer of 1 to 3; more preferably $R_a$ is a $C_{10-20}$ alkyl group, $R_b$ is a $C_{1-3}$ alkyl group, and n is an integer of 3), and examples thereof include dodecyltriethoxysilane, dodecyltrimethoxysilane, decyltriethoxysilane, decyltrimethoxysilane, ethyltriethoxysilane, ethyltrimethoxysilane, hexyltriethoxysilane, hexyltrimethoxysilane, hexadecyltriethoxysilane, hexadecyltrimethoxysilane, methyltriethoxysilane, methyltrimethoxysilane, octadecyltriethoxysilane, octadecyltrimethoxysilane, n-octyltriethoxysilane, n-octyltrimethoxysilane, propyltriethoxysilane, and propyltrimethoxysilane.

The method of surface treatment with the silane coupling agent is not particularly limited, and can be performed by a dry method, a wet method, or an integral blend method. Any method may be used, but a dry method or a wet method is preferable. When the filler is not surface-treated with a silane coupling agent containing an alkyl group, the surface impact characteristics are deteriorated.

The content of component C is 10 to 50 parts by weight, preferably 20 to 40 parts by weight, more preferably 20 to 30 parts by weight, based on the total 100 parts by weight of component A and component B. At or above the lower limit, rigidity and mechanical strength are suitable, and at or below the upper limit, thermal stability and impact resistance are suitable.

<Rubber-like Polymer>

The resin composition of the present invention is a resin composition which does not substantially contain a rubber-like polymer, and even if the resin composition contains a rubber-like polymer, the content thereof is not more than 3 parts by weight, preferably not more than 1 part by weight with respect to 100 parts by weight of the total of components A and B. Rubber-like polymers are polymers obtained by copolymerizing a vinyl monomer or a mixture of the vinyl monomer and any monomer other than the vinyl monomer in a single stage or multiple stages with a rubber component, and the rubber component specifically includes polybutadiene, diene-based copolymer, polyisoprene, copolymer of ethylene and α-olefin, copolymer of ethylene and unsaturated carboxylic acid ester, copolymer of ethylene and aliphatic vinyl, copolymer of ethylene, propylene and non-conjugated diene terpolymer, acrylic rubber, and silicone-based rubber. The inclusion of a rubber-like polymer deteriorates the surface impact characteristics.

<Other Additives>

The resin composition of the present invention may contain additives such as various stabilizers, mold release agents, colorants, and flame retardants which are conventionally added to polycarbonate resins, in addition to the above-mentioned components A to C.

(i) Stabilizer

Various known stabilizers can be added to the resin composition of the present invention. Examples of the stabilizer include phosphorus stabilizers, hindered phenol antioxidants, ultraviolet absorbers, and light stabilizers.

(i-1) Phosphorus-Based Stabilizer

Examples of the phosphorus-based stabilizer include phosphorous acid, phosphoric acid, phosphonous acid, phosphonic acid and esters thereof, and tertiary phosphines. Out of these, phosphorous acid, phosphoric acid, phosphonous acid, phosphonic acid, triorganophosphate compounds and acid phosphate compounds are preferred. The organic groups of the acid phosphate compounds include mono-substituents, di-substituents and mixtures thereof. In the following exemplary compounds corresponding to these compounds, the organic groups include the same as above.

The triorganophosphate compounds include trimethyl phosphate, triethyl phosphate, tributyl phosphate, trioctyl phosphate, tridecyl phosphate, tridodecyl phosphate, trilauryl phosphate, tristearyl phosphate, tricresyl phosphate, triphenyl phosphate, trichlorophenyl phosphate, diphenylcresyl phosphate, diphenylmonoorthoxenyl phosphate and tributoxyethyl phosphate. Out of these, trialkyl phosphates are preferred. The number of carbon atoms of the trialkyl phosphate is preferably 1 to 22, more preferably 1 to 4. The particularly preferred trialkyl phosphate is trimethyl phosphate.

The acid phosphate compounds include methyl acid phosphate, ethyl acid phosphate, butyl acid phosphate, butoxyethyl acid phosphate, octyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphate and bisphenol A acid phosphate. Out of these, long-chain dialkyl acid phosphates having 10 or more carbon atoms are preferred because they are effective in improving heat stability and have high stability themselves.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl) phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. These phosphite compounds include 2,2'-methylenebis(4,6-di-tert-butylphenyl) (2,4-di-tert-butylphenyl)phosphite, 2,2'-methylenebis(4,6-di-tert-butylphenyl)(2-tert-butyl-4-methylphenyl)phosphite and 2,2'-methylenebis(4,6-di-tert-butylphenyl)octyl phosphite.

Examples of the phosphonite compound include tetrakis (2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having an aryl group substituted by two or more alkyl groups.

Examples of the phosphonate compound include dimethylbenzene phosphonate, diethylbenzene phosphonate and dipropylbenzene phosphonate.

The tertiary phosphines include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine and diphenylbenzyl phosphine. Triphenyl phosphine is particularly preferred as the tertiary phosphine.

The preferred phosphorus-based stabilizer is selected from triorganophosphate compounds, acid phosphate compounds and phosphite compounds represented by the following formula (XIII). Triorganophosphate compounds are particularly preferably used.

[Chem. 17]

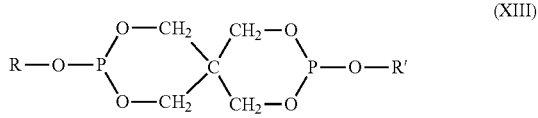

(XIII)

In the formula (XIII), R and R' are each an alkyl group having 6 to 30 carbon atoms, or aryl group or alkylaryl group having 6 to 30 carbon atoms and may be the same or different.

As described above, tetrakis(2,4-di-tert-butylphenyl)-biphenylene diphosphonites are preferred as the phosphonite compound, and stabilizers comprising the phosphonites as the main component are available on the market under the names of Sandostab P-EPQ (trademark, manufactured by Clariant) and Irgafos P-EPQ (trademark, manufactured by CIBA SPECIALTY CHEMICALS).

Out of the phosphite compounds represented by the above formula (XIII), distearyl pentaerythritol diphosphite, bis(2,4-di-tert-butylphenyl)pentaerythritol diphosphite, bis(2,6-di-tert-butyl-4-methylphenyl)pentaerythritol diphosphite and bis{2,4-bis(1-methyl-1-phenylethyl)phenyl}pentaerythritol diphosphite are more preferred.

(i-2) Hindered Phenol-Based Antioxidant

Various compounds which are generally mixed with a resin may be used as the hindered phenol compound. Examples of the hindered phenol compound include α-tocopherol, butylhydroxytoluene, sinapyl alcohol, vitamin E, octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl) propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl) propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5- di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris-2[3(3,5-di-tert-butyl-4-hydroxyphenyl) propionyloxy]ethyl isocyanurate, tetrakis[methylene-3-(3,5-di-tert-butyl-4-hydroxyphenyl) propionate]methane, triethylene glycol-N-bis-3-(3-tert-butyl-4-hydroxy-5-methylphenyl) propionate, triethylene glycol-N-bis-3-(3-tert-butyl-4-hydroxy-5-methylphenyl)acetate, 3,9-bis[2-{3-(3-tert-butyl-4-hydroxy-5-methylphenyl) acetyloxy}-1,1-dimethylethyl]-2,4,8,10-tetraoxaspiro[5,5] undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl)benzene and tris (3-tert-butyl-4-hydroxy-5-methylbenzyl)isocyanurate.

Out of the above compounds, tetrakis[methylene-3-(3-tert-butyl-4-hydroxy-5-methylphenyl)propionate]methane, octadecyl-3-(3,5-di-tert-butyl-4-hydroxyphenyl) propionate and 3,9-bis[2-{3-(3-tert-butyl-4-hydroxy-5-methylphenyl) propionyloxy}-1,1-dimethylethyl]-2,4,8,10-tetraoxaspiro[5, 5]undecane are preferably used in the present invention. 3,9-bis[2-{3-(3-tert-butyl-4-hydroxy-5-methylphenyl) propionyloxy}-1,1-dimethylethyl]-2,4,8,10-tetraoxaspiro[5,5] undecane is particularly preferred. The above hindered phenol-based antioxidants may be used alone or in combination of two or more.

Preferably, any one of the phosphorus-based stabilizer and the hindered phenol-based antioxidant is used. The phosphorus-based stabilizer is more preferably used, and the triorganophosphate compound is much more preferably used. The amounts of the phosphorus-based stabilizer and the hindered phenol-based antioxidant are each preferably 0.005 to 1 part by weight, more preferably 0.01 to 0.3 part by weight based on 100 parts by weight of the total of component A and component B.

(i-3) Ultraviolet Absorbent

The resin composition of the present invention may comprise an ultraviolet absorbent. Since the resin composition of the present invention has a good color, it can retain the color for a long time even when it is used outdoors by mixing an ultraviolet absorbent.

Benzophenone-based ultraviolet absorbents include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Benzotriazole-based ultraviolet absorbents include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl] benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with this monomer and a copolymer of 2-(2'-hydroxy-5-acryloxyethylphenyl)-2H-benzotriazole and a vinyl-based monomer copolymerizable with this monomer.

Hydroxyphenyltriazine-based ultraviolet absorbents include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, compounds having a 2,4-dimethylphenyl group as the phenyl group of the above compounds such as 2-(4,6-bis(2,4-dimethylphenyl)-1,3,5-triazin-2-yl)-5-hexyloxyphenol may also be used.

Cyclic iminoester-based ultraviolet absorbents include 2,2'-p-phenylenebis(3,1-benzoxazin-4-one), 2,2'-(4,4'-diphenylene)bis(3,1-benzoxazin-4-one) and 2,2'-(2,6-naphthalene)bis(3,1-benzoxazin-4-one).

Cyanoacrylate-based ultraviolet absorbents as the ultraviolet absorbent include 1,3-bis-[(2'-cyano-3',3'-diphenylacryloyl)oxy]-2,2-bis[(2-cyano-3,3-diphenylacryloyl)oxy] methyl)propane and 1,3-bis-[(2-cyano-3,3-diphenylacryloyl)oxy]benzene.

When the ultraviolet absorbent has a radically polymerizable monomer compound structure, it may be a polymer type ultraviolet absorbent obtained by copolymerizing an ultraviolet absorbing monomer and/or an optically stable monomer having a hindered amine structure with a monomer such as an alkyl(meth)acrylate. Preferred examples of the above ultraviolet absorbing monomer include compounds containing a benzotriazole skeleton, benzophenone skeleton, triazine skeleton, cyclic iminoester skeleton or cyanoacrylate skeleton in the ester substituent of a (meth) acrylic acid ester.

Among those identified above, benzotriazole-based and hydroxyphenyltriazine-based ultraviolet absorbents are preferred in terms of ultraviolet absorption ability, and cyclic iminoeser-based and cyanoacrylate-based ultraviolet absorbents are preferred in terms of heat resistance and color. The above ultraviolet absorbents may be used alone or in combination of two or more.

The content of the ultraviolet absorbent is preferably 0.01 to 2 parts by weight, more preferably 0.02 to 2 parts by weight, much more preferably 0.03 to 1 parts by weight, particularly preferably 0.05 to 0.5 part by weight based on 100 parts by weight of the total of component A and component B.

(1-4) Other Heat Stabilizers

The resin composition of the present invention may comprise another heat stabilizer except for the above phosphorus-based stabilizer and the above hindered phenol-based antioxidant. The other heat stabilizer is preferably used in combination with any one of the above stabilizer and the antioxidant, particularly preferably both of them. Preferred examples of the heat stabilizer include lactone-based stabilizers typified by a reaction product of 3-hydroxy-5,7-di-tert-butyl-furan-2-one and o-xylene (this stabilizer is detailed in JP-A 7-233160). This compound is marketed under the trade name of Irganox HP-136 (trademark, manufactured by CIBA SPECIALTY CHEMICALS) and may be used. A stabilizer prepared by mixing together the above compound, a phosphite compound and a hindered phenol compound is commercially available. A preferred example of this stabilizer is the Irganox HP-2921 of CIBA SPECIALTY CHEMICALS. This pre-mixed stabilizer may also be used in the present invention. The content of the lactone-based stabilizer is preferably 0.0005 to 0.05 part by weight, more preferably 0.001 to 0.03 part by weight based on 100 parts by weight of the total of component A and component B.

Other stabilizers include sulfur-containing stabilizers such as pentaerythritol tetrakis(3-mercaptopropionate), pentaerythritol tetrakis(3-laurylthiopropionate) and glycerol-3-stearyl thiopropionate. These stabilizers are effective especially when the resin composition is used for rotational molding. The content of the sulfur-containing stabilizer is preferably 0.001 to 0.1 part by weight, more preferably 0.01 to 0.08 part by weight based on 100 parts by weight of the total of component A and component B.

(ii) Release Agent

The resin composition of the present invention may further comprise a known release agent such as a fatty acid ester, polyolefin-based wax, silicone compound, fluorine compound (such as fluorine oil typified by polyfluoroalkyl ethers), paraffin wax or beeswax in order to improve productivity at the time of molding and the dimensional accuracy of a molded article. Since the resin composition of the present invention has high flowability, a molded article having excellent pressure propagation and uniform distortion is obtained. Meanwhile, release resistance tends to become large with the result that the deformation of a molded article tends to occur at the time of release. The above problem is solved by mixing the above specific component without impairing the characteristic properties of the resin composition.

The fatty acid ester is an ester of an aliphatic alcohol and an aliphatic carboxylic acid. The aliphatic alcohol may be either a monohydric alcohol or a polyhydric alcohol having 2 or more hydroxyl groups. The number of carbon atoms of the alcohol is preferably 3 to 32, more preferably 5 to 30. The aliphatic carboxylic acid has preferably 3 to 32 carbon atoms, more preferably 10 to 30 carbon atoms. A saturated aliphatic carboxylic acid is particularly preferred. The fatty acid ester is preferably a full ester as it is excellent in heat stability at a high temperature. The acid value of the fatty acid ester is preferably not more than 20 (can be substantially "0"). The hydroxyl value of the fatty acid ester is preferably 0.1 to 30. Further, the iodine value of the fatty acid ester is preferably not more than 10 (can be substantially "0"). These properties can be obtained by methods specified in JIS K 0070.

Examples of the polyolefin-based wax include polymers having a molecular weight of 1,000 to 10,000, such as an ethylene homopolymer, a-olefin homopolymers or copolymers having 3 to 60 carbon atoms, and copolymers of ethylene and an a-olefin having 3 to 60 carbon atoms. The above molecular weight is a number average molecular weight measured in terms of standard polystyrene by GPC (gel permeation chromatography). The upper limit of the number average molecular weight is preferably 6,000, more preferably 3,000. The number of carbon atoms of the α-olefin component of the polyolefin-based wax is preferably not more than 60, more preferably not more than 40. Preferred examples of the α-olefin component include propylene, 1-butene, 1-hexene, 4-methyl-1-pentene and 1-octene. Preferred examples of the polyolefin-based wax include an ethylene homopolymer and copolymers of ethylene and an α-olefin having 3 to 60 carbon atoms. The content of the α-olefin having 3 to 60 carbon atoms is preferably not more than 20 mol %, more preferably not more than 10 mol %. Commercially available products so-called "polyethylene wax" are preferably used.

The content of the release agent is preferably 0.005 to 5 parts by weight, more preferably 0.01 to 4 parts by weight, much more preferably 0.02 to 3 parts by weight based on 100 parts by weight of the total of component A and component B.

(iii) Dye or Pigment

The resin composition of the present invention can provide molded articles having various designs when it further comprises various dyes or pigments. Examples of the dye or pigment used in the present invention include perylene-based dyes, coumalin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes and phthalocyanine-based dyes.

When the resin composition of the present invention comprises a metallic pigment, a good metallic color can be obtained. The metallic pigment is preferably an aluminum powder. By blending a fluorescent brightener or a luminescent fluorescent dye other than the fluorescent brightener, a good design effect making use of a luminescent color can be provided.

Examples of the fluorescent dye (including a fluorescent brightener) used in the present invention include coumalin-based fluorescent dyes, benzopyran-based fluorescent dyes, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diaminostilbene-based fluorescent dyes. Out of these, coumalin-based fluorescent dyes, benzopyran-based fluorescent dyes and perylene-based fluorescent dyes are preferred because they have high heat resistance and rarely deteriorate at the time of molding the polycarbonate resin.

The content of the above dye or pigment is preferably 0.00001 to 1 part by weight, more preferably 0.00005 to 0.5 part by weight based on 100 parts by weight of the total of component A and component B.

(iv) Compounds with Heat Ray Absorption Capacity

The resin composition of the present invention may contain a compound having a heat ray absorption capacity. Examples of such compounds include phthalocyanine-based near-infrared absorbers, metal oxide-based near-infrared absorbers such as ATO, ITO, iridium oxide, ruthenium oxide, and imonium oxide, metal boride-based metal compounds such as lanthanum boride, cerium boride, and tungsten boride, tungsten oxide-based near-infrared absorbers, other various metal compounds having superior heat ray absorption capacity, and carbon fillers. As such a phthalocyanine-based near-infrared absorber, for example, MIR-362 manufactured by Mitsui Chemicals Co., Ltd. is commercially available and is readily available. Examples of the carbon filler include carbon black, graphite (including both natural and artificial), and fullerene. Carbon black and graphite are preferred. These can be used alone or in combination of two or more types thereof. The content of the phthalocyanine-based near infrared absorber is preferably 0.0005 to 0.2 parts by weight, more preferably 0.0008 to 0.1 parts by weight, and yet more preferably 0.001 to 0.07 parts by weight, based on 100 parts by weight of the total of components A and B. The content of the metal oxide-based near-infrared absorber, the metal boride-based near-infrared absorber, and the carbon filler in the resin composition of the present invention is preferably in the range of 0.1 to 200 ppm (weight ratio), and more preferably in the range of 0.5 to 100 ppm.

(v) Light Diffusing Agent

When the resin composition of the present invention is mixed with a light diffusing agent, a light diffusing effect can be provided. Examples of the light diffusing agent include polymer fine particles, inorganic fine particles having a low refractive index such as calcium carbonate and composites thereof. The polymer fine particles are fine particles which are already known as a light diffusing agent for polycarbonate resins. They are preferably acrylic crosslinked particles or silicone crosslinked particles typified by polyorganosilsesquioxane having a particle diameter of several m. The shape of the light diffusing agent is spherical, disk-like, columnar or amorphous. The spherical shape does not need to be perfectly spherical and includes a deformed shape, and the columnar shape includes a cubic shape. The light diffusing agent is preferably spherical and more preferred as it is more uniform in particle size. The content of the light diffusing agent is preferably 0.005 to 20 parts by weight, more preferably 0.01 to 10 parts by weight, much more preferably 0.01 to 3 parts by weight based on 100 parts by weight of the total of component A and component B. Two or more light diffusing agents may be used in combination.

(vi) Light High-Reflection White Pigment

When the resin composition of the present invention is mixed with a light high-reflection white pigment, a light reflection effect can be provided. As the white pigment, a titanium dioxide (especially titanium dioxide treated with an organic surface treating agent such as silicone) pigment is particularly preferred. The content of the light high-reflection white pigment is preferably 3 to 30 parts by weight, more preferably 8 to 25 parts by weight based on 100 parts by weight of the total of component A and component B. Two or more light high-reflection white pigments may be used in combination.

(vii) Antistatic Agent

Since there is a case where antistatic performance is required for the resin composition of the present invention, the resin composition preferably comprises an antistatic agent in this case. Examples of the antistatic agent include (1) organic sulfonic acid phosphonium salts such as arylsulfonic acid phosphonium salts typified by dodecylbenzenesulfonic acid phosphonium salts, and alkylsulfonic acid phosphonium salts, and boric acid phosphonium salts such as tetrafluoroboric acid phosphonium salts. The content of the phosphonium salt is suitably not more than 5 parts by weight, preferably 0.05 to 5 parts by weight, more preferably 1 to 3.5 parts by weight, much more preferably 1.5 to 3 parts by weight based on 100 parts by weight of the total of component A and component B.

Other examples of the antistatic agent include (2) organic sulfonic acid alkali (earth) metal salts such as organic lithium sulfonate, organic sodium sulfonate, organic potassium sulfonate, organic cesium sulfonate, organic rubidium sulfonate, organic calcium sulfonate, organic magnesium sulfonate and organic barium sulfonate. The metal salts are also used as a flame retardant as described above. Specific examples of the metal salts include metal salts of dodecylbenzenesulfonic acid and metal salts of perfluoroalkanesulfonic acid. The content of the organic sulfonic acid alkali (earth) metal salt is suitably not more than 0.5 part by weight, preferably 0.001 to 0.3 part by weight, more preferably 0.005 to 0.2 part by weight based on 100 parts by weight of the total of component A and component B. Alkali metal salts of potassium, cesium and rubidium are particularly preferred.

Still other examples of the antistatic agent include (3) organic sulfonic acid ammonium salts such as alkylsulfonic acid ammonium salts and arylsulfonic acid ammonium salts. The content of the ammonium salt is suitably not more than 0.05 part by weight based on 100 parts by weight of the total of component A and component B. Further examples of the antistatic agent include (4) polymers containing a poly(oxyalkylene)glycol component such as polyether ester amide as a constituent component. The content of the polymer is suitably not more than 5 parts by weight based on 100 parts by weight of the total of component A and component B.

(viii) Acidity Adjusting Agent

An acidity adjusting agent composed of a carboxylic acid compound or an anhydrous carboxylic acid compound in the form of a low molecular or a polymer can be added to the resin composition of the present invention. By adding these components, the resin composition is not likely to undego a thermal decomposition reaction or oxidative reaction in the temperature range where melt-processing is performed. Since substances which cause a side reaction with a polycarbonate resin or a polyester resin are present in the product produced by the decomposition reaction, color hue deterioration or molecular weight reduction may occur due to discoloration in the case of molding by heating and melting or when the molded article has a thermal history. Deterioration of the hue and a decrease in molecular weight tend to occur as the temperature increases, and in particular, a decomposition reaction of the carbonate bond tends to occur in a basic atmosphere. In order to suppress such decomposition, a method of adjusting the resin acidity by adding an acidity adjusting agent to the resin composition as described above is preferable. The acidity adjusting agent is a compound having a pk (the logarithm of the reciprocal of the dissociation constant of the acid) in the weakly acidic region, and the preferred range of pk is from 4 to 7, particularly preferably from 4.5 to 5.5. Examples of low molecular weight acidity adjusting agent include aliphatic monocarboxylic acids such as acetic acid, propionic acid, palmitic acid, stearic acid, and arachidic acid; aliphatic dicarboxylic acids such as oxalic acid, malonic acid, and succinic acid; acid anhydrides of aliphatic carboxylic acids such as acetic anhydride and succinic anhydride; aromatic monocarboxylic acids such as benzoic acid; and aromatic dicarboxylic acids such as isophthalic acid. Examples of polymeric acidity adjusting agent include styrene-acrylic acid copolymers and styrene-maleic anhydride copolymers.

The content of the acidity adjusting agent is preferably 0.0001 to 1 part by weight, more preferably 0.001 to 0.5 parts by weight, based on 100 parts by weight of the total of component A and component B. By adding an acidity adjusting agent, the resin composition of the present invention can exhibit the desired suitable characteristics even under molding conditions at higher temperatures.

(ix) Other Additives

Thermoplastic resins other than component A and component B, elastomers, other flow modifiers, antimicrobial agents, dispersants such as liquid paraffin, photocatalytic antifouling agents, and photochromic agents can be added to the resin composition of the present invention.

Examples of such other resins include resins such as polyamide resins, polyimide resins, polyetherimide resins, polyurethane resins, silicone resins, polyphenylene ether resins, polyphenylene sulfide resins, polysulfone resins, polyethylene, polypropylene and other polyolefin resins, polystyrene resins, acrylonitrile/styrene copolymers (AS resins), polymethacrylate resins, phenolic resins, epoxy resins, cyclic polyolefin resins, polylactic acid resins, polycaprolactone resins, and thermoplastic fluorine resins (represented by polyvinylidene fluoride resins). Examples of the elastomer include acrylic elastomers, polyester elastomers, and polyamide elastomers.

The content of the other thermoplastic resin or elastomer is preferably 30 parts by weight or less, more preferably 20 parts by weight or less, based on 100 parts by weight of the total of component A and component B.

(Production of Resin Composition)

To produce the resin composition of the present invention, any method is employed. For example, the components A, B, and C and optional additives are pre-mixed, and then the mixture is melt-kneaded to be pelletized. Means for pre-mixing includes nauta mixer, V-type blender, Henschel mixer, mechanochemical device and extrusion mixer. In pre-mixing, granulation may be performed with an extruder granulator, a briquetting machine, or the like as necessary. To pre-mix the above components, for example, when the component A contains a powdery component, part of the powdery component is blended with the additives to prepare a master batch of the additives diluted with the powder, and the master batch is used. After pre-mixing, the mixture is melt-kneaded with a melt kneader such as a vent twin screw extruder and pelletized with a pelletizer or other device. Examples of the melt kneader include a Banbury mixer, a kneading roll, and constant heat stirring vessel. However, the vent twin screw extruder is preferable.

Alternatively, a method in which each component is independently supplied to a melt kneader such as a twin-screw extruder without pre-mixing may be adopted. Another method includes pre-mixing a part of the ingredients and thereafter feeding them to a melt kneader independently of the remaining ingredients. In particular, when an inorganic filler is mixed, it is preferable that the inorganic filler be supplied into the molten resin from a supply port in the middle of the extruder using a supply device such as a side feeder. The means of pre-mixing and granulation are the same as described above. When the components to be mixed are in a liquid state, a so-called liquid injection device or a liquid hydrogenating device can be used for supply to the melt kneading machine.

An extruder having a vent from which water contained in the raw material and a volatile gas generated from the molten kneaded resin can be removed may be preferably used. A vacuum pump is preferably installed to discharge the generated water and volatile gas from the vent to the outside of the extruder efficiently. A screen for removing foreign matter contained in the extruded raw material may be installed in a zone before the die of the extruder to remove the foreign matter from the resin composition. Examples of the screen include a metal net, a screen changer and a sintered metal plate (such as a disk filter).

Examples of the melt kneader include a twin-screw extruder, a Banbury mixer, a kneading roller, a single screw extruder, and a multi-screw extruder having three or more screws.

Further, it is preferable that the moisture contained in component A and component B be small prior to melt-kneading. Thus, it is more preferable to dry one or both of component A and component B by any of various methods such as hot air drying, electromagnetic wave drying, and vacuum drying before melting and kneading. The vent suction degree during melt kneading is preferably in the range of 1 to 60 kPa, preferably 2 to 30 kPa.

The resin extruded as described above is pelletized by directly cutting it or by forming it into a strand and cutting the strand with a pelletizer. When the influence of extraneous dust must be reduced at the time of pelletization, the atmosphere surrounding the extruder is preferably made clean. In the production of the above pellets, the narrowing of the form distribution of the pellets, the reduction of the number of miscut products and the amount of fine powders produced at the time of conveyance or transportation and the cutting of the number of cells (vacuum cells) formed in the strand or pellet can be suitably carried out by using various methods already proposed for polycarbonate resins for use in optical disks. Thereby, it is possible to increase the molding cycle and reduce the generation rate of a defect such as a silver streak. The shape of the pellet may be columnar, rectangular column-like, spherical or other ordinary shape, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

<Articles Formed of the Resin Composition of the Present Invention>

Molded articles formed of the resin composition of the present invention can be obtained by molding the pellet produced as described above, preferably by injection molding, extrusion molding. For injection molding, not only ordinary molding techniques but also injection compression molding, injection press molding, gas assist injection molding, foam molding (including what comprises the injection of a super-critical fluid), insert molding, in-mold coating molding, insulated runner molding, quick heating and cooling molding, two-color molding, multi-color molding, sandwich molding and super high-speed injection molding techniques may be used. For molding, either one of cold-runner molding and hot-runner molding techniques may be selected.

The resin composition of the present invention may be formed into a profile extrusion molded article, a sheet or a film by extrusion molding. To mold a sheet or a film, inflation, calendering and casting techniques may also be used. Further, specific drawing operation may be used to mold it into a heat shrinkable tube. The resin composition of the present invention can be formed into a molded article by rotational molding or blow molding as well.

EXAMPLES

The present invention will be further described by way of the following Examples. However, the present invention is not limited thereto. Unless otherwise stated, parts in the Examples are parts by weight and % is wt %. Evaluation and resin pellet production were carried out by the following methods.

(I) Polyester Resin Evaluation (1) Elemental Titanium Content

Measurement was carried out using an Agilent 7500cs ICP-mass spectrometer manufactured by Agilent Technologies. For the samples, sulfuric acid was added to the weighed sample, and after ashing the resin by microwave decomposition, nitric acid was further added thereto and the residual metal obtained by microwave decomposition was adjusted with ultrapure water to a predetermined volume. The amount of Ti element was measured from the residue.

(2) Intrinsic Viscosity (IV value)

After heating and dissolving 0.6 g of the resin composition in 50 ml of orthochlorophenol, the resin composition was cooled to room temperature, and the viscosity of the resulting resin solution was measured at 35° C. using an Ostwald viscosity tube. The intrinsic viscosity (IV value) was determined from the obtained solution viscosity data.

(II) Formation of Resin Pellet

A polycarbonate-polydiorganosiloxane copolymer resin, An aromatic polycarbonate resin, polyester resin, filler and additives were mixed together in amounts shown in Tables 1 and 2 by means of a blender and melt kneaded together by means of a vented double-screw extruder to obtain a pellet formed of the resin composition of the present invention. After pre-mixing the aromatic polycarbonate resin powder and the additives other than the filler having a concentration 10 to 100 times higher than their mixing ratios, it was totally mixed by means of the blender. The TEX-30α-31.5BW-2V of The Nippon Steel Works, Ltd. (completely interlocking type, unidirectional rotation, two screws) was used as the vented double-screw extruder. Single kneading zone was installed before the vent inlet. As for extrusion conditions, the delivery rate was 20 kg/h, the screw revolution was 120 rpm, the vacuum degree of the vent was 3 kPa, the extrusion temperature from the first feed port to the die was 270° C.

(III) Resin Composition Evaluation (III-1) Moisture and Heat Resistance

After the resin pellets obtained in (II) above were dried at 120° C. for about 5 hours to reduce the moisture content in the resin pellets to 200 ppm or less, an evaluation sample having a length of 70 mm, a width of 50 mm, and a thickness of 2.0 mm was continuously injection molded using an injection molding machine (SG260M-HP manufactured by Sumitomo Heavy Industries, Ltd.) at a cylinder temperature or 280° C., a mold temperature of 70° C., a molding cycle of 50 seconds, and an injection rate of 15 mm/sec. The evaluation sample was allowed to stand under an environment of a temperature of 23° C. and a relative humidity of 50% for 24 hours in order to obtain an evaluation sample prior to moisture and heat treatment, and the evaluation sample prior to moisture and heat treatment was left in a constant temperature and constant humidity tester at a temperature of 80° C. and a relative humidity of 95% for 500 hours in order to be subjected to a moisture and heat treatment, and then left again at a temperature of 23° C. and a relative humidity of 50% for 24 hours in order to obtain an evaluation sample after moisture and heat treatment.

The evaluation samples prior to moisture and heat treatment and after moisture and heat treatment were pulverized so that foreign matter was not mixed therein, dried at 120° C. for about 5 hours to reduce the moisture content in the resin pellets to 200 ppm or less, and then the MVR (melt volume rate) thereof was measured for each of the pulverized samples by the method according to ISO1133 under conditions of a temperatures 280° C. and a loads of 2.16 kgf. The measurements were carried out by a semi-auto-melt indexer type 2A manufactured by Toyo Seiki Co., Ltd. The moisture and heat resistance was calculated in accordance with the following formula, and the rate of change before and after the moisture and heat treatment (ΔMVR (moisture and heat resistance)) was calculated. The greater the ΔMVR, the greater the resin deterioration of the molded article and the inferior the moisture-heat resistance.

ΔMVR (moisture and heat resistance)=100×(MVR of evaluation sample after moisture and heat treatment)/(MVR of evaluation sample prior to moisture and heat treatment)

(III-2) Thermal Stability

After the resin pellets obtained in the above (II) were dried at 120° C. for about 5 hours to reduce the moisture content in the resin pellets to 200 ppm or less, an evaluation sample having a length of 70 mm, a width of 50 mm, and a thickness of 2.0 mm was continuously injection-molded using an injection molding machine (SG260M-HP manufactured by Sumitomo Heavy Industries, Ltd.) at a cylinder temperature of 280° C., a mold temperature of 70° C., a molding cycle of 50 seconds, and an injection rate of 15 mm/sec to obtain a continuous molded article evaluation sample (the quality of the evaluation sample of the continuous molded article was substantially the same as that of the evaluation sample prior to moisture and heat treatment described above). After the continuous molded article evaluation sample was obtained, the molding machine was stopped for 10 minutes, and the molten resin was retained in the molding machine cylinder. After 10 minutes from the stoppage of the molding machine, molding was started again, and the second shot from reshaping was used as a retention molded article evaluation sample.

The continuous molded article and retention molded article were pulverized so that foreign matter was not mixed therein, dried at 120° C. for about 5 hours to reduce the moisture content in the resin pellets to 200 ppm or less, and then the MVR (melt volume rate) thereof was measured for each of the pulverized samples by the method according to ISO1133 under conditions of a temperatures 280° C. and a loads of 2.16 kgf. The measurements were carried out by a semi-auto-melt indexer type 2A manufactured by Toyo Seiki Co., Ltd. Thermal stability was calculated according to the following formula, and the rate of change in MVR before and after retention (ΔMVR (thermal stability)) was calculated. The larger the ΔMVR (thermal stability), the larger the resin deterioration at the time of staying and the lower the thermal stability.

ΔMVR (thermal stability)=100×(MVR of retention molded article evaluation sample)/(MVR of continuous molded article evaluation sample)

(III-3) Flexural Modulus

After the resin pellets obtained in (II) above were dried at 120° C. for about 5 hours to reduce the moisture content in the resin pellets to 200 ppm or less, the evaluation samples were molded using an injection molding machine (SG260M-HP manufactured by Sumitomo Heavy Industries, Ltd.) under the conditions of a cylinder temperature of 280° C., a mold temperature of 70° C., a molding cycle of 50 seconds, and an injection rate of 15 mm/sec, and flexural modulus was measured in accordance with ISO178. In the present invention, the rigidity is preferably 3400 MPa or more, and more preferably 4800 MPa or more.

(III-4) DuPont Impact (Surface Impact)

The resin pellets obtained in (II) above were dried at 120° C. for about 5 hours to reduce the moisture content in the resin pellet to 200 ppm or less, and thereafter an evaluation sample having a length of 150 mm, a width of 150 mm, and a thickness of 3 mm was molded using an injection molding machine (SG260M-HP manufactured by Sumitomo Heavy Industries, Ltd.) at a cylinder temperature of 280° C. and a mold temperature of 70° C. The obtained evaluation sample was treated in a hot air dryer at 150° C. for 1 hour, and then left for 24 hours at a temperature of 23° C. and a relative humidity of 50%. Furthermore, after the evaluation sample was treated for 5 hours under a temperature of −30° C., the fracture energy was calculated from the height at which crack was generated when dropping an impact core (tip shape flat) of a 3 kg load at a temperature of −30° C. directly below the evaluation sample. In the present invention, the DuPont impact strength is preferably equal to or greater than 5 J, and more preferably equal to or greater than 10 J. The maximum impact energy measurable at a load of 3 kg in this tester is 30 J.

(III-5) Chemical Resistance

After the resin pellets obtained in (II) above were dried at 120° C. for about 5 hours to reduce the moisture content in the resin pellet to 200 ppm or less, a 1A-type evaluation sample conforming to IS0527-1 and 2 was molded using an injection molding machine (SG260M-HP manufactured by Sumitomo Heavy Industries, Ltd.) under at a cylinder temperature of 280° C., a mold temperature of 70° C., a molding cycle of 50 seconds, and an injection rate of 15 mm/sec. 6 MPa distortions were applied to the molded evaluation samples, and the samples were immersed in Esso regular gasoline for 30 minutes under conditions of 23° C. and 50% relative humidity. The chemical resistance was evaluated by visually observing the appearance before and after strain was applied to the portion to be evaluated.

Good: samples with no change in appearance before and after immersion and no defects Poor: samples having changes in appearance before and after soaking and cracking or fracturing has occurred Examples 1 to 17 and Comparative Examples 1 to 8

Resin composition pellets composed of the components described in Tables 1 and 2 were produced, and the resin compositions were evaluated by the above methods. The evaluation results are shown in Tables 1 and 2.

(Component A)

A-1: Polycarbonate-polydiorganosiloxane copolymer resin powder (8.2% polydiorganosiloxane component content) having a viscosity average molecular weight of 24,000, produced from bisphenol A, phosgene, and a polydiorganosiloxane compound A-2: Polycarbonate resin powder (Panlite L-1225WX, manufactured by Teijin Co., Ltd.) having a viscosity-average molecular weight of 19,700, produced from bisphenol A and phosgene by interfacial condensation polymerization (Component B)

B-1: Polyethylene terephthalate resin produced by the following method

While a solution in which monolauryl phosphate was dissolved in ethylene glycol heated to 100° C. was agitated, a mixed solution of ethylene glycol containing titanium tetrabutoxide and acetic acid was slowly added thereto to complete the reaction between the titanium compound and the phosphorus compound, whereby a catalyst was produced. Next, an ester oligomer was produced from ethylene glycol and terephthalic acid by a conventional method, and thereafter, the ester oligomer was placed in a polycondensation reaction vessel together with the above catalyst to carry out the polycondensation reaction. The degree of progress of the polycondensation was checked by monitoring the load on the stirring blades in the reaction system and the reaction was terminated when the desired degree of polymerization was reached. Thereafter, the reaction mixture in the system was continuously extruded in a strand from the discharge unit, cooled and solidified, and cut to prepare granular pellets of polyethylene terephthalate having a particle diameter of about 3 mm. (IV=0.53, titanium element content of 23 ppm)

B-2: Polyethylene terephthalate resin produced by the following method

B-1 was further semicrystallized using a high-speed stirring fluid crystallizer, crystallized and dried under nitrogen flow, and solid-phase polycondensation was carried out under nitrogen flow in a packed solid-phase polymerization column. The reaction time was adjusted to obtain B-2. (IV=0.77, titanium element content of 24 ppm)

B-3: Polyethylene terephthalate resin having an IV of 0.52 produced using a Ge-based catalyst (TR-MB manufactured by Teijin Corporation).

B-4: Polyethylene terephthalate resin having an IV of 0.83 produced using a Ge-based catalyst (TR-8580H manufactured by Teijin Corporation).

B-5: Polyethylene terephthalate resin having an IV of 0.84 produced using a Ti—Mg based catalyst (7802 manufactured by Nanya).

B-6: Polyethylene terephthalate resin having an IV of 0.84 produced using a Sb-based catalyst (AA08E manufactured by Nanya).

(Component C)

C-1: Wollastonite produced by surface-treating a Wollastonite (NYGLOS4W manufactured by NYCO Minerals, Inc.) having an average particle size of 7 μm with hexadecyltrimethoxysilane C-2: Wollastonite produced by surface-treating a Wollastonite (NYGLOS4W manufactured by NYCO Minerals, Inc.) having an average particle size of 7 μm with octadecyltrimethoxysilane C-3: Talc produced by surface-treating a Talc (Victory light TK-RC, manufactured by Shokozan Mining Co., Ltd.) having an average particle size of 2 μm with hexadecyltrimethoxysilane C-4: Mica produced by surface-treating a wet-pulverized mica (KWM-200 manufactured by Kinseimatech Corporation) having an average particle size of 40 μm with hexadecyltrimethoxysilane C-5 (for comparative use): A wet-pulverized mica (KWM-200 manufactured by Kinseimatech Corporation) having an average particle size of 40 μm C-6 (for comparative use): Mica produced by surface-treating a wet-pulverized mica (KWM-200 manufactured by Kinseimatech Corporation) having an average particle size of 40 μm with a silane-coupling agent containing an epoxy group (Other Components)

D-1: Bis(2,4-di-t-butylphenyl)pentaerythritol diphosphite (Songnox 6260PW manufactured by Song Wong)

D-2: Trimethylphosphate (TMP manufactured by Daihachi Chemical Industries, Ltd.)

D-3: Pentaerythritol tetrastearate (EW400 manufactured by Riken Vitamin, Co., Ltd.)

E-1 (rubber-like polymer): A composite rubber-based graft copolymer made by grafting methyl methacrylate to 90 wt % of a composite rubber having a structure in which a polyorganosilicon rubber component and a polyalkyl(meth)acrylate rubber component are intertwined so as not to separate from each other (Metablen S2001 manufactured by Mitsubishi Rayon Co., Ltd.)

TABLE 1

|  |  |  | \multicolumn{9}{c}{Examples} |
|---|---|---|---|---|---|---|---|---|---|---|---|
|  |  |  | 1 | 2 | 3 | 4 | 5 | 6 | 7 | 8 | 9 |
| Component A | A-1 | Weight % | 45 | 37 | 25 | 15 | 37 | 37 | 37 | 37 | 37 |
|  | A-2 | Weight % | 45 | 38 | 25 | 15 | 38 | 38 | 38 | 38 | 38 |
| Component B | B-1 | Weight % |  |  |  |  | 25 |  |  |  |  |
|  | B-2 | Weight % | 10 | 25 | 50 | 70 |  |  |  |  |  |
|  | B-3 | Weight % |  |  |  |  |  | 25 |  |  |  |
|  | B-4 | Weight % |  |  |  |  |  |  | 25 |  |  |
|  | B-5 | Weight % |  |  |  |  |  |  |  | 25 |  |
|  | B-6 | Weight % |  |  |  |  |  |  |  |  | 25 |
| Total (Component A + Component B) |  | p.b.w | 100 | 100 | 100 | 100 | 100 | 100 | 100 | 100 | 100 |
| Component C | C-1 | p.b.w | 25 | 25 | 25 | 25 | 25 | 25 | 25 | 25 | 25 |
|  | C-2 | p.b.w |  |  |  |  |  |  |  |  |  |
|  | C-3 | p.b.w |  |  |  |  |  |  |  |  |  |
|  | C-4 | p.b.w |  |  |  |  |  |  |  |  |  |
| Other Components | D-1 | p.b.w | 0.2 | 0.2 | 0.2 | 0.2 | 0.2 | 0.2 | 0.2 | 0.2 | 0.2 |
|  | D-2 | p.b.w | 0.02 | 0.02 | 0.02 | 0.02 | 0.02 | 0.02 | 0.02 | 0.02 | 0.02 |
|  | D-3 | p.b.w | 0.3 | 0.3 | 0.3 | 0.3 | 0.3 | 0.3 | 0.3 | 0.3 | 0.3 |
| Blank | MVR (*1) | cm³/10 min | 6 | 8 | 13 | 15 | 10 | 10 | 7 | 7 | 7 |
| Moist and Heat | MVR (*2) | cm³/10 min | 10 | 13 | 23 | 28 | 15 | 23 | 16 | 15 | 17 |
| Resistance | ΔMVR | % | 167 | 163 | 177 | 187 | 150 | 230 | 229 | 214 | 243 |
| Heat Stability | MVR (residual) | cm³/10 min | 7 | 10 | 17 | 20 | 12 | 15 | 12 | 12 | 12 |
|  | ΔMVR | % | 117 | 125 | 131 | 133 | 120 | 150 | 171 | 171 | 171 |
| Flexural modulus |  | MPa | 4850 | 4870 | 4950 | 5000 | 4890 | 4900 | 4880 | 4880 | 4890 |
| Dupont impact |  | J | 20.6 | 17.6 | 14.7 | 11.8 | 14.7 | 14.7 | 17.6 | 17.6 | 17.6 |
| Chemical resistance |  | Good/Poor | Good | Good | Good | Good | Good | Good | Good | Good | Good |

|  |  |  | \multicolumn{8}{c}{Examples} |
|---|---|---|---|---|---|---|---|---|---|---|
|  |  |  | 10 | 11 | 12 | 13 | 14 | 15 | 18 | 17 |
| Component A | A-1 | Weight % | 10 | 75 | 37 | 37 | 37 | 37 | 37 | 37 |
|  | A-2 | Weight % | 65 |  | 38 | 38 | 38 | 38 | 38 | 38 |
| Component B | B-1 | Weight % |  |  |  |  |  |  |  |  |
|  | B-2 | Weight % | 25 | 25 | 25 | 25 | 25 | 25 | 25 | 25 |
|  | B-3 | Weight % |  |  |  |  |  |  |  |  |
|  | B-4 | Weight % |  |  |  |  |  |  |  |  |
|  | B-5 | Weight % |  |  |  |  |  |  |  |  |
|  | B-6 | Weight % |  |  |  |  |  |  |  |  |
| Total (Component A + Component B) |  | p.b.w | 100 | 100 | 100 | 100 | 100 | 100 | 100 | 100 |
| Component C | C-1 | p.b.w | 25 | 25 | 15 | 50 |  |  |  | 25 |
|  | C-2 | p.b.w |  |  |  |  | 25 |  |  |  |
|  | C-3 | p.b.w |  |  |  |  |  | 25 |  |  |
|  | C-4 | p.b.w |  |  |  |  |  |  | 25 |  |
| Other Components | D-1 | p.b.w | 0.2 | 0.2 | 0.2 | 0.2 | 0.2 | 0.2 | 0.2 |  |
|  | D-2 | p.b.w | 0.02 | 0.02 | 0.02 | 0.02 | 0.02 | 0.02 | 0.02 |  |
|  | D-3 | p.b.w | 0.3 | 0.3 | 0.3 | 0.3 | 0.3 | 0.3 | 0.3 |  |
| Blank | MVR (*1) | cm³/10 min | 15 | 6 | 10 | 8 | 8 | 10 | 7 | 8 |
| Moist and Heat | MVR (*2) | cm³/10 min | 25 | 10 | 15 | 11 | 13 | 19 | 14 | 12 |
| Resistance | ΔMVR | % | 167 | 167 | 150 | 183 | 163 | 190 | 200 | 150 |
| Heat Stability | MVR (residual) | cm³/10 min | 18 | 9 | 12 | 10 | 10 | 15 | 11 | 11 |
|  | ΔMVR | % | 120 | 150 | 120 | 167 | 125 | 150 | 167 | 136 |
| Flexural modulus |  | MPa | 5050 | 4800 | 3430 | 7850 | 4850 | 4050 | 5800 | 4900 |
| Dupont impact |  | J | 14.7 | 19.1 | 22.1 | 5.9 | 17.6 | 22.1 | 5.9 | 17.6 |
| Chemical resistance |  | Good/Poor | Good | Good | Good | Good | Good | Good | Good | Good | p.b.w = parts by weight (*1) Continuous molding (*2) After the moist and heat treatment

TABLE 2

| | | | Comparative examples | | | | | | | |
|---|---|---|---|---|---|---|---|---|---|---|
| | | | 1 | 2 | 3 | 4 | 5 | 6 | 7 | 8 |
| Component A | A-1 | Weight % | 37 | 37 | 37 | 10 | 50 | 37 | 37 | |
| | A-2 | Weight % | 38 | 38 | 38 | 10 | 50 | 38 | 38 | 75 |
| Component B | B-1 | Weight % | | | | | | | | |
| | B-2 | Weight % | 25 | 25 | 25 | 80 | | 25 | 25 | 25 |
| | B-3 | Weight % | | | | | | | | |
| | B-4 | Weight % | | | | | | | | |
| | B-5 | Weight % | | | | | | | | |
| | B-6 | Weight % | | | | | | | | |
| Total (Component A + Component B) | | p.b.w | 100 | 100 | 100 | 100 | 100 | 100 | 100 | 100 |
| Component C | C-1 | p.b.w | | | 50 | | 25 | | 70 | |
| | C-4 | p.b.w | | | | 25 | | | | 25 |
| | C-5 | p.b.w | 25 | | | | | | | |
| | C-6 | p.b.w | | 25 | | | | | | |
| Other Components | D-1 | p.b.w | 0.2 | 0.2 | 0.2 | 0.2 | 0.2 | 0.2 | 0.2 | 0.2 |
| | D-2 | p.b.w | 0.02 | 0.02 | 0.02 | 0.02 | 0.02 | 0.02 | 0.02 | 0.02 |
| | D-3 | p.b.w | 0.3 | 0.3 | 0.3 | 0.3 | 0.3 | 0.3 | 0.3 | 0.3 |
| | E-1 | p.b.w | | | 5 | | | | | |
| Blank | MVR (*1) | cm³/10 min | 7 | 8 | 7 | 17 | 5 | 12 | 4 | 17 |
| Humidity Heat Resistance | MVR (*2) | cm³/10 min | 14 | 15 | 11 | 30 | 9 | 19 | 9 | 27 |
| | ΔMVR | % | 200 | 188 | 157 | 176 | 180 | 158 | 225 | 159 |
| Heat Stability | MVR (residual) | cm³/10 min | 11 | 12 | 10 | 22 | 8 | 16 | 8 | 20 |
| | ΔMVR | % | 157 | 150 | 143 | 129 | 160 | 133 | 200 | 118 |
| Flexural modulus | | MPa | 6030 | 6100 | 7780 | 5020 | 4850 | 2300 | 8850 | 5850 |
| Dupont impact | | J | 4.4 | 4.4 | 4.4 | 2.9 | 22.1 | >30 | 2.9 | 4.4 |
| Chemical resistance | | Good/Poor | Good | Good | Good | Good | Poor | Good | Good | Good | p.b.w = parts by weight
(*1) continuous molding
(*2) after the moist and heat treatment As shown in Tables 1 and 2, Comparative Example 1 and Comparative Example 2 used a filler which was not surface-treated with a silane coupling agent containing an alkyl group, and thus, the surface impact characteristics thereof were inferior to those of the Examples. Comparative Example 3 contains a rubber-like polymer, and thus, had inferior surface impact characteristics as compared with Examples. Comparative Example 4 was inferior in surface impact characteristics as compared to the Examples because the polycarbonate resin content thereof was less than the claimed range. Comparative Example 5 was inferior in chemical resistance because the content of the polyester resin was less than the claimed range. Comparative Example 6 was inferior in flexural modulus because the content of the C component was less than the claimed range. In Comparative Example 7, since the content of the C component was higher than the claimed range, the thermal stability and the surface impact characteristics were inferior. In Comparative Example 8, since the content of component A1 was smaller than that the claimed range the surface impact characteristics thereof were inferior.

INDUSTRIAL APPLICABILITY

Molded articles using the resin composition of the present invention are useful for various applications of electric/electronic equipment, cameras, OA equipment, precision machinery, vehicles, in particular, for vehicle interior and exterior parts, as well as agricultural materials, transportation containers, entertainment machines, and general purpose goods. Examples of vehicle interior parts and exterior parts include interior door handles, instrument panels, center instrument clusters, exterior door handles, door mirror stays, door mirror covers, pillars, fenders, rear doors, aerodynamic parts such as front air dams, side air dams, and spoilers, roofs, bumpers, trunk lids, and wheel covers.

The invention claimed is:

1. A resin composition comprising,
(A) 30 to 99 parts by weight of a resin (component A)
(B) 1 to 70 parts by weight of a polyester resin (component B), and
(C) with respect to 100 parts by weight of a total amount of the resin (component A) and the polyester resin (component B), 10 to 50 parts by weight of a filler (component C) which is surface-treated with a silane coupling agent having an alkyl group,
wherein the resin composition does not comprise a polyolefin resin,
the resin (component A) is composed of less than 100 wt % of a polycarbonate-polydiorganosiloxane copolymer resin (component A1) and more than 0 wt % of an aromatic polycarbonate resin (component A2),
the aromatic polycarbonate resin (component A2) is not a polyester carbonate,
a weight ratio of component A1 to component A2 (component A1/component A2) is 37/38 or more,
a content of a rubber-like polymer is 1 part by weight or less with respect to 100 parts by weight of the total amount of the resin (component A) and the polyester resin (component B),
the filler of the component C is at least one filler selected from the group consisting of talc, mica, and wollastonite, and has an average particle size of 1 to 100 μm,
the silane coupling agent having the alkyl group of the component C has the chemical formula $R_{an}Si(OR_b)_{4-n}$, where $R_a$ is an alkyl group having 16 to 18 carbon atoms, $R_b$ is an alkyl group having 1 to 5 carbon atoms, and n is an integer of 1 to 3, and
the polyester resin (component B) is at least one polyester selected from the group consisting of polyethylene terephthalate, polytrimethylene terephthalate, polybutylene terephthalate, polyhexylene terephthalate, polyethylene naphthalate, polybutylene naphthalate, polyethylene-1,2-bis(phenoxy)ethane-4,4'-dicarboxylate, polyethylene isophthalate/terephthalate and polybutylene terephthalate/isophthalate.

2. The resin composition according to claim 1, wherein a catalyst used in the production of the component B is a titanium-phosphorus catalyst which is obtained from a reaction between a titanium compound (I) represented by the following formula (I) or a titanium compound obtained by reacting the titanium compound (I) with an aromatic polycarboxylic acid represented by the following formula (II) or an anhydride thereof and a phosphorus compound represented by the following formula (III) at a reaction molar ratio (mTi/mP) of a titanium atom equivalent molar amount (mTi) of the titanium compound and a phosphorus atom equivalent molar amount (mP) of the phosphorus compound in the range of 1/3 to 1/1:

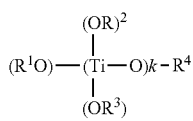
(I)

where $R^1$, $R^2$, $R^3$, and $R^4$ each independently represent an alkyl group having 2 to 10 carbon atoms, k represents an integer of 1 to 3, and when k is 2 or 3, two or three $R^2$ and $R^3$ may be the same or different from each other,

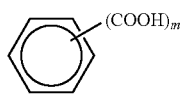
(II)

where m represents an integer of 2 to 4,

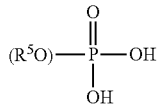
(III)

where $R^5$ is an unsubstituted or substituted aryl group having 6 to 20 carbon atoms or an alkyl group having 1 to 20 carbon atoms.

3. The resin composition according to claim 1, wherein a titanium element content of the component B is 0.001 to 50 ppm.

4. The resin composition according to claim 2, wherein the titanium-phosphorus catalyst is a compound represented by the following formula (IV):

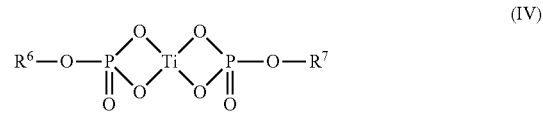
(IV)

where $R^6$ and $R^7$ each independently represent an alkyl group having 2 to 12 carbon atoms or an aryl group having 6 to 12 carbon atoms.

5. The resin composition according to claim 1, wherein the component B is polyethylene terephthalate.

6. A molded article formed of the resin composition according to claim 1.

7. The molded article according to claim 6, wherein the molded article is an injection-molded article or an extrusion-molded article.

8. The molded article according to claim 6, wherein the molded article is a vehicle interior parts or a vehicle exterior parts.

9. The resin composition according to claim 1, wherein the resin (component A) is composed of 50 wt % or more and less than 100 wt % of the polycarbonate-polydiorganosiloxane copolymer resin (component A1) and more than 0 wt % and 50 wt % or less of the aromatic polycarbonate resin (component A2).

10. The resin composition according to claim 1, wherein the polyester resin (component B) is at least one polyester selected from the group consisting of polyethylene terephthalate, polybutylene terephthalate, polyethylene naphthalate, and polybutylene naphthalate.

11. The resin composition according to claim 1, wherein the filler (component C) has the average particle size of 2 to 7 μm, and the content of component C is 15 to 30 parts by weight with respect to 100 parts by weight of the total amount of the resin (component A) and the polyester resin (component B).

* * * * *